(12) United States Patent
Song et al.

(10) Patent No.: US 10,305,866 B2
(45) Date of Patent: May 28, 2019

(54) DATA TRANSMISSION METHOD, BASE STATION AND USER EQUIPMENT

(71) Applicant: Huawei Technologies Co., Ltd., Shenzhen (CN)

(72) Inventors: Huanhuan Song, Chengdu (CN); Hong Wen, Chengdu (CN); Jie Tang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 195 days.

(21) Appl. No.: 15/592,385

(22) Filed: May 11, 2017

(65) Prior Publication Data

US 2017/0250962 A1 Aug. 31, 2017

Related U.S. Application Data

(63) Continuation of application No. PCT/CN2015/077423, filed on Apr. 24, 2015.

(30) Foreign Application Priority Data

Nov. 25, 2014 (CN) .......................... 2014 1 0691042

(51) Int. Cl.
*H04L 29/06* (2006.01)
*H04B 7/0456* (2017.01)
*H04K 1/00* (2006.01)

(52) U.S. Cl.
CPC ....... *H04L 63/0428* (2013.01); *H04B 7/0456* (2013.01); *H04K 1/006* (2013.01); *H04L 2209/80* (2013.01)

(58) Field of Classification Search
CPC . H04L 63/0428; H04L 2209/80; H04K 1/006; H04B 7/0456
See application file for complete search history.

(56) References Cited

U.S. PATENT DOCUMENTS 5,241,598 A * 8/1993 Raith ........................ H04L 9/12
340/5.26
7,230,935 B2 6/2007 Proctor, Jr. et al.
(Continued)

FOREIGN PATENT DOCUMENTS

| CN | 101471907 A | 7/2009 |
|---|---|---|
| CN | 101902265 A | 12/2010 |

(Continued)

OTHER PUBLICATIONS

Foreign Communication From a Counterpart Application, Chinese Application No. 201410691042.4, Chinese Search Report dated Jan. 15, 2018, 2 pages.

(Continued)

*Primary Examiner* — Meng Li
(74) *Attorney, Agent, or Firm* — Conley Rose, P.C.

(57) ABSTRACT

A data transmission method, a base station, and user equipment are presented. The method includes performing rotation processing on a preset precoding matrix; performing precoding processing on to-be-sent information according to a precoding matrix obtained after the rotation processing; and sending to-be-sent information obtained after the precoding processing. In the embodiments of the present disclosure, indication information shared by a transmit end and a receive end is used to indicate whether to rotate a precoding matrix, and to-be-sent information is precoded according to the indication information. The transmit end and the receive end in this method learn the indication information in advance, and system security is improved by instructing the precoding matrix to perform flexible transformation.

8 Claims, 7 Drawing Sheets

(56) References Cited

U.S. PATENT DOCUMENTS

| | | | |
|---|---|---|---|
| 7,398,078 | B2 | 7/2008 | Lansen et al. |
| 8,468,343 | B2 | 6/2013 | Liu et al. |
| 2006/0204009 | A1 | 9/2006 | Li et al. |
| 2010/0266061 | A1 | 10/2010 | Cheng et al. |
| 2011/0002404 | A1* | 1/2011 | Choi .................. H04B 7/0417 375/260 |
| 2011/0081901 | A1* | 4/2011 | Moulsley ............. H04B 7/024 455/422.1 |
| 2012/0062421 | A1 | 3/2012 | Su et al. |
| 2012/0174187 | A1 | 7/2012 | Argon et al. |
| 2014/0040985 | A1 | 2/2014 | Wang |

FOREIGN PATENT DOCUMENTS

| | | |
|---|---|---|
| CN | 102647257 A | 8/2012 |
| CN | 102647258 A | 8/2012 |
| CN | 102869013 A | 1/2013 |
| CN | 103210592 A | 7/2013 |
| CN | 103354463 A | 10/2013 |

OTHER PUBLICATIONS

Foreign Communication From a Counterpart Application, Chinese Application No. 201410691042.4, Chinese Office Action dated Feb. 2, 2018, 3 pages.

Machine Translation and Abstract of Chinese Publication No. CN101902265, Dec. 1, 2010, 7 pages.

Machine Translation and Abstract of Chinese Publication No. CN102647257, Aug. 22, 2012, 13 pages.

Machine Translation and Abstract of Chinese Publication No. CN102647258, Aug. 22, 2012, 6 pages.

Machine Translation and Abstract of Chinese Publication No. CN102869013, Jan. 19, 2013, 12 pages.

Machine Translation and Abstract of Chinese Publication No. CN103354463, Oct. 16, 2013, 10 pages.

Catt, "Simulation results for pre-coding (codebook vs. non-codebook)," 3GPP TSG RAN WG1 Meeting #48, R1-070838, Feb. 12-16, 2007, 4 pages.

Samsung, "MIMO precoding for E-UTRA Downlink," 3GPP TSG RAN WG1 Meeting #48, R1-070944, Feb. 12-16, 2007, 11 pages.

Catt, et al., "Pre-coding for EUTRA TDD," 3GPP TSG RAN WG1 Meeting #48bis, R1-071749, Mar. 26-30, 2007, 4 pages.

Alamouti, S., et al., "A Simple Transmit Diversity Technique for Wireless Communications," IEEE Journal on Select Areas in Communications, vol. 16, No. 8, Oct. 1998, pp. 1451-1458.

Donglai, S., et al., "SecDCF: An Optimized Cross-layer Scheduling Scheme Based on Physical Layer Security," IEEE ICC, 2011, 5 pages.

Hero, A., "Secure Space-Time Communication," IEEE Transactions on information Theory, vol. 49, No. 12, Dec. 2003, pp. 3235-3249.

Joham, M., et al., "Linear Transmit Processing in MIMO Communications Systems," IEEE Transactions on Signal Processing, vol. 53, No. 8, Aug. 2005, pp. 2700-2712.

Love, D., et al., "An Overview of Limited Feedback in Wireless Communication Systems," IEEE Journal on Selected Areas in Communications, vol. 26, No. 8, Oct. 2008, pp. 1341-1365.

Scaglione, A., et al., "Optimal Designs for Space-Time Linear Precoders and Decoders," IEEE Transactions on Signal Processing, vol. 50, No. 5, May 2002, pp. 1051-1064.

Shafiee, S., et al., "Achievable Rates in Gaussian MISO Channels with Secrecy Constraints," ISIT, Jun. 24-Jun. 29, 2007, pp. 2466-2470.

Wang, H., et al., "Joint Cooperative Beamforming and Jamming to Secure AF Relay Systems with Individual Power Constraint and No Eavesdroppers CSI," IEEE Signal Processing Letters, vol. 20, No. 1, Jan. 2013, pp. 39-42.

Wen, H., et al., "A Cross-layer Approach to Enhance the Security of Wireless Networks Based on MIMO," IEEE, 2009, pp. 935-939.

Wen, H., et al., "MIMO Cross-Layer Secure Communication Architecture Based on STBC," 2010, 5 pages.

Wen, H., et al., "Framework for MIMO cross-layer secure communication based on STBC," Telecommunication Systems, 2013, pp. 2177-2185.

Okamoto, E., "A Chaos MIMO Transmission Scheme for Channel Coding and Physical-Layer Security," XP001575089, IEICE Trans. Commun., vol. E95-B, No. 4, Apr. 2012, pp. 1384-1392.

Ma, R., et al., "Secure Communication in TDS-OFDM System Using Constellation Rotation and Noise Insertion," XP011320037, IEEE Transactions on Consumer Electronics, vol. 56, No. 3, Aug. 2010, pp. 1328-1332.

Li, H., et al., "Secure Transmission in OFDM Systems by Using Time Domain Scrambling," XP032547625, IEEE, 2013, 6 pages.

Tahir, M., et al., "A Hybrid Scheme for Wireless Physical Layer Security Based on Encryption and Channel Pre-compensation," XP055383548, IETE Journal of Research, vol. 60, No. 4, Jul.-Aug. 2014, 10 pages.

Foreign Communication From a Counterpart Application, European Application No. 15863716.5, Extended European Search Report dated Jun. 30, 2017, 9 pages.

Foreign Communication From a Counterpart Application, PCT Application No. PCT/CN2015/077423, English Translation of International Search Report dated Aug. 13, 2015, 2 pages.

Foreign Communication From a Counterpart Application, PCT Application No. PCT/CN2015/077423, English Translation of Written Opinion dated Aug. 17, 2015, 6 pages.

\* cited by examiner

DATA TRANSMISSION METHOD, BASE STATION AND USER EQUIPMENT

CROSS-REFERENCE TO RELATED APPLICATIONS

This application is a continuation of International Application No. PCT/CN2015/077423, filed on Apr. 24, 2015, which claims priority to Chinese Patent Application No. 201410691042.4, filed on Nov. 25, 2014, both of which are hereby incorporated by reference in their entireties.

TECHNICAL FIELD

Embodiments of the present disclosure relate to the field of wireless communications technologies, and more specifically, to a data transmission method, a base station, and user equipment.

BACKGROUND

The wireless communications technologies have been widely used in various fields and have advantages such as low costs, high flexibility, and convenience for device maintenance. Because free space is used to propagate information-carried carriers in wireless communication, communication information of two parties may be exposed easily, and is open to an eavesdropper. Therefore, a wireless communications security problem needs to be resolved at a physical layer.

In the wireless communications technologies, a precoding technology is an important means to improve wireless communications reliability, and is one of key technologies for improving communications performance in a multiple input multiple output (MIMO) system. The precoding technology is a transmitter preprocesses a transmit signal using channel information, so as to adapt to a channel environment change and weaken multipath fading channel interference, thereby reducing a system bit error rate and improving a system throughput.

An existing method for transmitting data based on a MIMO physical layer security technology depends much on a channel. Therefore, a quicker change of a channel feature results in lower system security.

SUMMARY

Embodiments of the present disclosure provide a data transmission method, a base station, and user equipment, so as to improve system security.

According to a first aspect, a data transmission method is provided. The method includes performing rotation processing on a preset precoding matrix; performing precoding processing on to-be-sent information according to a precoding matrix obtained after the rotation processing; and sending to-be-sent information obtained after the precoding processing.

With reference to the first aspect, in a first possible implementation manner of the first aspect, the performing rotation processing on a preset precoding matrix includes obtaining indication information, where the indication information is used to instruct a base station to perform the rotation processing on the preset precoding matrix; and performing the rotation processing on the preset precoding matrix according to the indication information.

With reference to the first aspect, in a second possible implementation manner of the first aspect, the method further includes sending indication information, where the indication information is used to instruct user equipment to perform the rotation processing on the preset precoding matrix.

With reference to the first or the second possible implementation manner of the first aspect, in a third possible implementation manner of the first aspect, the indication information is carried based on a pseudo random keystream $F=(f_1, f_2, \ldots, f_i, \ldots)$, where $f_i$ is indication information at an $i^{th}$ moment, and i is a real number greater than or equal to zero.

With reference to any one of the first to the third possible implementation manners of the first aspect, in a fourth possible implementation manner of the first aspect, the indication information is one-bit indication information or multi-bit indication information.

With reference to any one of the first aspect, or the first to the fourth possible implementation manners of the first aspect, in a fifth possible implementation manner of the first aspect, the performing rotation processing on a preset precoding matrix includes performing the rotation processing on the preset precoding matrix, so that the preset precoding matrix is rotated by 180 degrees.

With reference to the fifth possible implementation manner of the first aspect, in a sixth possible implementation manner of the first aspect, the indication information is one-bit indication information, and the performing the rotation processing on the preset precoding matrix, so that the preset precoding matrix is rotated by 180 degrees includes performing the rotation processing on the preset precoding matrix based on the following formula, so that the preset precoding matrix is rotated by 180 degrees:

$$W_{opt}^i = e^{j\pi f_i} W_{opt},$$

where $W_{opt}$ is the preset precoding matrix, $W_{opt}^i$ is a precoding matrix obtained after rotation processing at an $i^{th}$ moment, $f_i$ is indication information at the $i^{th}$ moment, and i is a real number greater than or equal to zero.

According to a second aspect, a data transmission method is provided. The method includes obtaining to-be-decoded information; performing rotation processing on a preset precoding matrix; and performing decoding processing on the to-be-decoded information according to a precoding matrix obtained after the rotation processing.

With reference to the second aspect, in a first possible implementation manner of the second aspect, the method further includes sending indication information, where the indication information is used to instruct a base station to perform the rotation processing on the preset precoding matrix.

With reference to the second aspect, in a second possible implementation manner of the second aspect, the performing rotation processing on a preset precoding matrix includes obtaining indication information, where the indication information is used to instruct user equipment to perform the rotation processing on the preset precoding matrix; and performing the rotation processing on the preset precoding matrix according to the indication information.

With reference to the first or the second possible implementation manner of the second aspect, in a third possible implementation manner of the second aspect, the indication information is carried based on a pseudo random keystream $F=(f_1, f_2, \ldots, f_i, \ldots)$, where $f_i$ is indication information at an $i^{th}$ moment, and i is a real number greater than or equal to zero.

With reference to any one of the first to the third possible implementation manners of the second aspect, in a fourth possible implementation manner of the second aspect, the indication information is one-bit indication information or multi-bit indication information.

With reference to any one of the second aspect, or the first to the fourth possible implementation manners of the second aspect, in a fifth possible implementation manner of the second aspect, the performing rotation processing on a preset precoding matrix includes performing the rotation processing on the preset precoding matrix, so that the preset precoding matrix is rotated by 180 degrees.

With reference to the fifth possible implementation manner of the second aspect, in a sixth possible implementation manner of the second aspect, the indication information is one-bit indication information, and the performing the rotation processing on the preset precoding matrix, so that the preset precoding matrix is rotated by 180 degrees includes performing the rotation processing on the preset precoding matrix based on the following formula, so that the preset precoding matrix is rotated by 180 degrees:

$$W_{opt}^{i}=e^{j\pi f_i}W_{opt},$$

where $W_{opt}$ is the preset precoding matrix, $W_{opt}^{i}$ is a precoding matrix obtained after rotation processing at an $i^{th}$ moment, $f_i$ is indication information at the $i^{th}$ moment, and i is a real number greater than or equal to zero.

According to a third aspect, a base station is provided, including a rotation unit configured to perform rotation processing on a preset precoding matrix; a precoding unit configured to perform precoding processing on to-be-sent information according to a precoding matrix obtained after the rotation processing; and a sending unit configured to send to-be-sent information obtained after the precoding processing.

With reference to the third aspect, in a first possible implementation manner of the third aspect, the base station further includes an obtaining unit configured to obtain indication information, where the indication information is used to instruct the base station to perform the rotation processing on the preset precoding matrix. The rotation unit is configured to perform the rotation processing on the preset precoding matrix according to the indication information obtained by the obtaining unit.

With reference to the third aspect, in a second possible implementation manner of the third aspect, the sending unit is further configured to send indication information, where the indication information is used to instruct user equipment to perform the rotation processing on the preset precoding matrix.

With reference to the first or the second possible implementation manner of the third aspect, in a third possible implementation manner of the third aspect, the indication information is carried based on a pseudo random keystream $F=(f_1, f_2, \ldots, f_i, \ldots)$, where $f_i$ is indication information at an $i^{th}$ moment, and i is a real number greater than or equal to zero.

With reference to any one of the first to the third possible implementation manners of the third aspect, in a fourth possible implementation manner of the third aspect, the indication information is one-bit indication information or multi-bit indication information.

With reference to any one of the third aspect, or the first to the fourth possible implementation manners of the third aspect, in a fifth possible implementation manner of the third aspect, the rotation unit is configured to perform the rotation processing on the preset precoding matrix, so that the preset precoding matrix is rotated by 180 degrees.

With reference to the fifth possible implementation manner of the third aspect, in a sixth possible implementation manner of the third aspect, the indication information is one-bit indication information, and the rotation unit is configured to perform the rotation processing on the preset precoding matrix based on the following formula, so that the preset precoding matrix is rotated by 180 degrees:

$$W_{opt}^{i}=e^{j\pi f_i}W_{opt},$$

where $W_{opt}$ is the preset precoding matrix, $W_{opt}^{i}$ is a precoding matrix obtained after rotation processing at an $i^{th}$ moment, $f_i$ is indication information at the $i^{th}$ moment, and i is a real number greater than or equal to zero.

According to a fourth aspect, user equipment is provided, including an obtaining unit configured to obtain to-be-decoded information; a rotation unit configured to perform rotation processing on a preset precoding matrix; and a decoding unit configured to perform decoding processing on the to-be-decoded information according to a precoding matrix obtained after the rotation processing.

With reference to the fourth aspect, in a first possible implementation manner of the fourth aspect, the user equipment further includes a sending unit configured to send indication information, where the indication information is used to instruct a base station to perform the rotation processing on the preset precoding matrix.

With reference to the fourth aspect, in a second possible implementation manner of the fourth aspect, the obtaining unit is further configured to obtain indication information, where the indication information is used to instruct the user equipment to perform the rotation processing on the preset precoding matrix. The rotation unit is configured to perform the rotation processing on the preset precoding matrix according to the indication information.

With reference to the first or the second possible implementation manner of the fourth aspect, in a third possible implementation manner of the fourth aspect, the indication information is carried based on a pseudo random keystream $F=(f_1, f_2, \ldots, f_i, \ldots)$, where $f_i$ is indication information at an $i^{th}$ moment, and i is a real number greater than or equal to zero.

With reference to any one of the first to the third possible implementation manners of the fourth aspect, in a fourth possible implementation manner of the fourth aspect, the indication information is one-bit indication information or multi-bit indication information.

With reference to any one of the fourth aspect, or the first to the fourth possible implementation manners of the fourth aspect, in a fifth possible implementation manner of the fourth aspect, the rotation unit is configured to perform the rotation processing on the preset precoding matrix, so that the preset precoding matrix is rotated by 180 degrees.

With reference to the fifth possible implementation manner of the fourth aspect, in a sixth possible implementation manner of the fourth aspect, the indication information is one-bit indication information, and the rotation unit is configured to perform the rotation processing on the preset precoding matrix based on the following formula, so that the preset precoding matrix is rotated by 180 degrees:

$$W_{opt}^{i}=e^{j\pi f_i}W_{opt},$$

where $W_{opt}$ is the preset precoding matrix, $W_{opt}^{i}$ is a precoding matrix obtained after rotation processing at an $i^{th}$ moment, $f_i$ is indication information at the $i^{th}$ moment, and i is a real number greater than or equal to zero.

In the embodiments of the present disclosure, indication information shared by a transmit end and a receive end is used to indicate whether to rotate a precoding matrix, and to-be-sent information is precoded according to the indication information. The transmit end and the receive end in this method learn the indication information in advance, and system security is improved by instructing the precoding matrix to perform flexible transformation.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
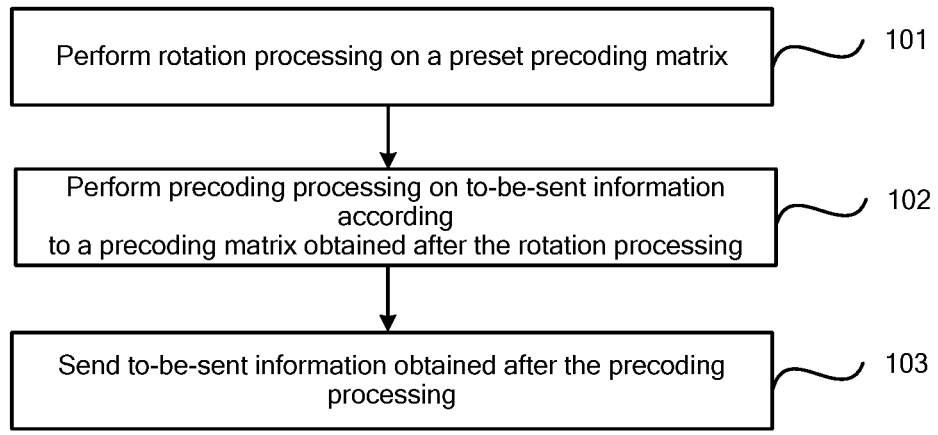
FIG. 1 is a schematic flowchart of a data transmission method according to an embodiment of the present disclosure.

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, or the like.

User equipment (UE) may also be referred to as a mobile terminal (MT), mobile user equipment, and the like, and may communicate with one or more core networks using a radio access network (RAN). The user equipment may be a mobile terminal, such as a mobile phone (which is also referred to as a "cellular" phone) and a computer with a mobile terminal. For example, the user equipment may be a portable, pocket-sized, hand-held, computer built-in, or in-vehicle mobile apparatus.

A base station may be a base station (BTS) in GSM or CDMA, or may be a base station (NodeB) in WCDMA, or may further be an evolved NodeB (eNB or e-NodeB for short) in LTE. This is not limited in the present disclosure.

There are two types of precoding: linear precoding and non-linear precoding. For space division multiplexing, a LTE system supports not only space division multiplexing in an open-loop manner but also space division multiplexing in a closed-loop manner. That is, the system supports a linear precoding technology. The non-linear precoding is of high complexity, and a decoding algorithm at a receive end is complex. Therefore, the LTE system generally uses the linear precoding technology.

The linear precoding is classified into two types of precoding according to locations in which precoding matrices are obtained: codebook-based precoding and non-codebook-based precoding. The codebook-based precoding includes codebook-based closed-loop spatial multiplexing precoding and codebook-based open-loop spatial multiplexing precoding.

In a manner of the codebook-based closed-loop spatial multiplexing precoding, a precoding matrix is obtained at the receive end. The receive end selects, using predicted channel state information (CSI), the precoding matrix from a preset precoding codebook, and feeds back a selected precoding matrix indicator (PMI) to a transmit end. There are multiple manners of constructing a precoding codebook, such as a codebook based on antenna selection, a codebook based on a transmit adaptive array (TxAA) mode, a codebook based on discrete Fourier transform (DFT), and a random codebook.

In a manner of the codebook-based open-loop spatial multiplexing precoding, accurate feedback is difficult to obtain due to a PMI report delay in a high-speed movement scenario. Therefore, open-loop spatial multiplexing does not depend on any precoding-related recommendation from the receive end, and does not need any direct precoding information that is from a network and that is used to notify the receive end. Contrarily, the precoding matrix is selected on the condition that the receive end notifies in advance the transmit end of manners of defining and selecting the precoding matrix. Commonly used precoding is cyclic delay diversity (CDD) precoding.

The non-codebook-based precoding is similar to the codebook-based precoding. The non-codebook precoding is applicable only to downlink shared channel (DL-SCH) transmission. A main difference between the non-codebook-based precoding and the codebook-based precoding is in a demodulation reference signal (DM-RS) before precoding. A non-codebook precoding manner needs to use a dedicated pilot, that is, a data symbol and a pilot symbol jointly perform a precoding operation. In this way, the receive end may obtain an equivalent precoded channel only by means of channel estimation, so as to facilitate data demodulation. In the non-codebook precoding manner, a weighted value of precoding is obtained by the transmit end. The transmit end calculates a precoding matrix using CSI obtained by the base station on an uplink. Common precoding calculation methods include singular value decomposition (SVD), geometric mean decomposition (GMD), uniform channel decomposition (UCD), and the like.

It should be understood that all the precoding manners listed above may be applied to the embodiments of the present disclosure.

FIG. 1 is a schematic flowchart of a data transmission method according to an embodiment of the present disclosure. The method may be performed by a transmit end, and the transmit end may be a base station. The method includes the following steps.

Step 101. Perform rotation processing on a preset precoding matrix.

Step 102. Perform precoding processing on to-be-sent information according to a precoding matrix obtained after the rotation processing.

Step 103. Send to-be-sent information obtained after the precoding processing.

In this embodiment of the present disclosure, indication information shared by a transmit end and a receive end is used to indicate whether to rotate a precoding matrix, and to-be-sent information is precoded according to the indication information. The transmit end and the receive end in this method learn the indication information in advance, and system security is improved by instructing the precoding matrix to perform flexible transformation.

In addition, according to this embodiment of the present disclosure, a cross-layer security solution is implemented and an eavesdropping error rate is improved with reference to a physical layer security technology and an upper-layer cryptographic technique instead of depending on channel information.

It should be understood that the preset precoding matrix may be a precoding matrix that is preset before transmission, or may be a selected optimal precoding matrix. This is not limited in the present disclosure.

The performing rotation processing on a preset precoding matrix may obtain the following effect. When a vector is multiplied by a number, a direction of the vector changes but a value of the vector does not change. Rotation processing performed on the precoding matrix may be implemented based on an existing method for performing rotation processing on a matrix. In this embodiment of the present disclosure, the rotation processing performed on the precoding matrix may be implemented in a manner of directly multiplying the precoding matrix by $e^{jw}$ or $e^{-jw}$, where w is an angle of rotation. For example, if $w=\pi$, $e^{jw}$ indicates that the matrix is rotated by 180 degrees in a counterclockwise direction, and $e^{-jw}$ indicates that the matrix is rotated by 180 degrees in a clockwise direction.

It should be understood that, in this embodiment of the present disclosure, the rotation processing may be performed on the precoding matrix at a selected moment. The precoding matrix may not be rotated but may be directly precoded at another moment. For example, in this embodiment of the present disclosure, it may be set that precoding matrix rotation is performed at a second moment, a fifth moment, a $10^{th}$ moment, and the like.

In this embodiment of the present disclosure, the precoding processing may be performed based on linear precoding. Before sending the to-be-sent information, the transmit end may perform the precoding processing on the to-be-sent information. The to-be-sent precoded information may be sent by the transmit end.

An existing precoding process may be as follows.

(1) Hierarchically map inputted spatial multiplexing code words $X_1$ and $X_2$, to obtain a space time coding matrix X, where X is a M×T-dimensional matrix, M indicates a quantity of data stream layers, and T is a quantity of transmit periods.

(2) Multiply the space time coding matrix X by an $N_t$×M-dimensional precoding matrix $W_{opt}$ before transmission, where $W_{opt}X$ indicates that space time symbols of M layers are mapped to $N_t$ transmit antennas.

(3) Transmit a pilot signal (RS). The pilot signal reaches the receive end by passing through a fading channel to perform channel estimation. After a precoding selection process, a signal finally received by the receive end is:

$$y=HW_{opt}X+n,$$

where H is channel information, $W_{opt}$ is the precoding matrix, and n is an additive white Gaussian noise.

(4) Determine an equivalent spatial channel matrix as:

$$\overline{H}=HW_{opt}.$$

(5) The receive end performs decoding.

For ease of description, the decoding herein is performed using a zero forcing algorithm, and a linear association coefficient matrix is:

$$\overline{H}^{+}=[\overline{H}^{H}\overline{H}]^{-1}\overline{H}^{H}.$$

(6) Detect a transmit signal and the transmit signal is:

$$\tilde{X}=\overline{H}^{+}y=\overline{H}^{+}\overline{H}X+\overline{H}^{+}n=X+\overline{H}^{+}n.$$

In this case, the transmit signal X is restored by ignoring a noise.

In the foregoing precoding process, the performing rotation processing on a preset precoding matrix in this embodiment of the present disclosure is to perform rotation processing on the foregoing $W_{opt}$. Precoding processing is performed on a rotated precoding matrix, and to-be-sent information obtained after the precoding processing is sent.

Optionally, in another embodiment, a rotation processing process in this embodiment of the present disclosure may be implemented based on $W_{opt}{}^{i}=e^{jwfi}W_{opt}$, where w is an angle of rotation.

Optionally, in another embodiment, in step 102, the transmit end may obtain indication information, where the indication information is used to instruct the base station to perform the rotation processing on the preset precoding matrix, and may perform the rotation processing on the preset precoding matrix according to the indication information.

It should be understood that there are multiple manners of obtaining the indication information. The transmit end may perform the rotation processing on the precoding matrix based on indication information shared in advance, or may perform the rotation processing on the precoding matrix based on indication information sent by the receive end. A manner of obtaining the indication information is not limited in this embodiment of the present disclosure.

Optionally, in another embodiment, the method may further include sending indication information, where the indication information is used to instruct user equipment to perform the rotation processing on the preset precoding matrix.

It should be understood that, in this embodiment of the present disclosure, the indication information may be used to instruct the transmit end (for example, a base station) or the receive end (for example, user equipment) to perform the rotation processing on the preset precoding matrix. The indication information may separately exist in the transmit end and the receive end in a shared manner, and the transmit end includes the same indication information as that included in the receive end. The indication information may indicate that rotation is performed at some moments, and the moments are learned by both the transmit end and the receive end. In this embodiment of the present disclosure, the indication information may be used by the receive end to instruct the transmit end to perform precoding matrix rotation, or the indication information may be used by the transmit end to instruct the receive end to perform precoding matrix rotation. This embodiment of the present disclosure does not impose a limitation thereto.

Optionally, in another embodiment, the indication information in this embodiment of the present disclosure may be carried based on a pseudo random keystream $F=(f_1, f_2, \ldots, f_i, \ldots)$, where $f_i$ is indication information at an $i^{th}$ moment, and i is a real number greater than or equal to zero.

The indication information based on the pseudo random keystream in this embodiment of the present disclosure is the information shared in advance by the transmit end and the receive end. This method is carried based on existing shared information. The method is simple and convenient, and is easy to implement.

In various embodiments, $f_i$ is the indication information at the $i^{th}$ moment, and is used to instruct the precoding matrix to rotate at the $i^{th}$ moment.

Optionally, in another embodiment, the indication information may be one-bit indication information or multi-bit indication information.

According to this embodiment of the present disclosure, multi-bit indication information is used to indicate rotation of the precoding matrix, and is difficult for an eavesdropper to crack. Therefore, system security can be improved.

In various embodiments, the pseudo random keystream $F=(f_1, f_2, \ldots, f_i, \ldots)$ is used to represent the indication information. If the indication information is one-bit indication information, a bit 0 or a bit 1 may be used to indicate whether to rotate the precoding matrix. For example, when $f_i$ is 0, it indicates that the precoding matrix is not rotated at the $i^{th}$ moment; or when $f_i$ is 1, it indicates that the precoding matrix is rotated at the $i^{th}$ moment. If the indication information is multi-bit indication information, multiple bits may be used to indicate whether to rotate the precoding matrix. For example, if the indication information is two-bit indication information, and when $f_{2i}f_{2i+1}=00$, it indicates that the precoding matrix is not rotated at the $i^{th}$ moment; or when $f_{2i}f_{2i+1} \neq 00$, it indicates that the precoding matrix is rotated at the $i^{th}$ moment.

Optionally, in another embodiment, in step 102, the transmit end may perform the rotation processing on the preset precoding matrix, so that the preset precoding matrix is rotated by 180 degrees.

According to this embodiment of the present disclosure, the precoding matrix is rotated by 180 degrees, so that an eavesdropping error rate of an eavesdropper can reach the maximum. Therefore, system security is improved.

Optionally, in another embodiment, in step 102, the indication information is one-bit indication information, and the transmit end may perform the rotation processing on the preset precoding matrix based on the following formula, so that the preset precoding matrix is rotated by 180 degrees:

$$W_{opt}^i = e^{j\pi f_i} W_{opt},$$

where $W_{opt}$ is the preset precoding matrix, $W_{opt}^i$ is a precoding matrix obtained after rotation processing at an $i^{th}$ moment, $f_i$ is indication information at the $i^{th}$ moment, and i is a real number greater than or equal to zero. In this case, the to-be-sent precoded information may be represented as $y_1 = He^{j\pi f_i} W_{opt} X + n$.

Figure 2:
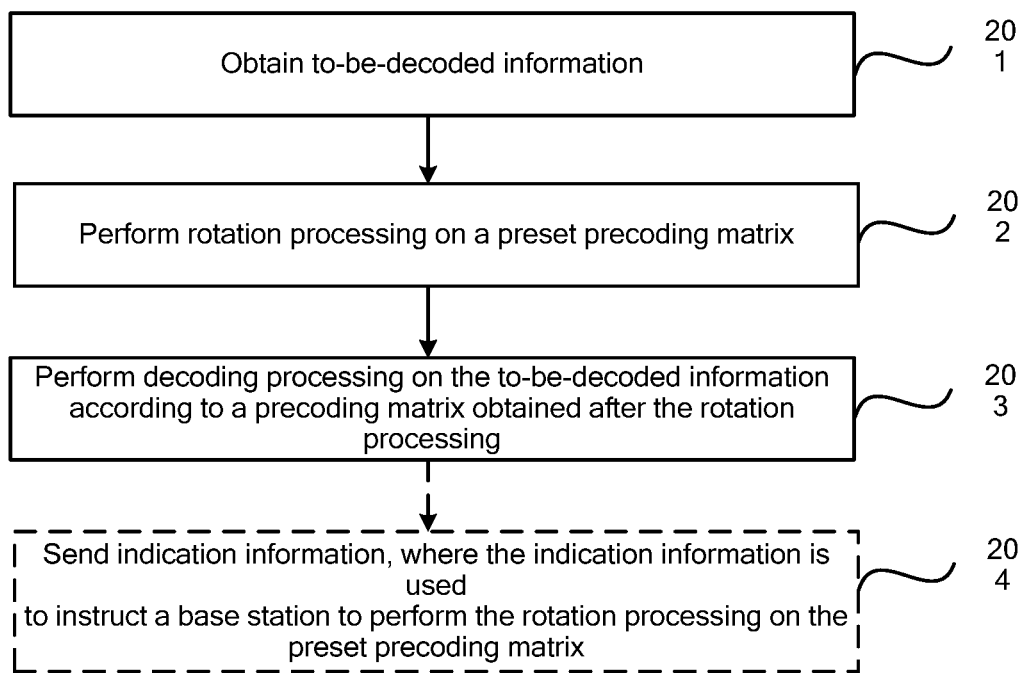
FIG. 2 is a schematic flowchart of a data transmission method according to another embodiment of the present disclosure.

FIG. 2 is a schematic flowchart of a data transmission method according to another embodiment of the present disclosure. The method may be performed by a receive end, and the receive end may be user equipment. The method includes the following steps.

Step 201. Obtain to-be-decoded information.

Step 202. Perform rotation processing on a preset precoding matrix.

Step 203. Perform decoding processing on the to-be-decoded information according to a precoding matrix obtained after the rotation processing.

In this embodiment of the present disclosure, indication information shared by a transmit end and a receive end is used to indicate whether to rotate a precoding matrix, and to-be-decoded information is decoded according to the indication information. The transmit end and the receive end in this method learn the indication information in advance, and system security is improved by instructing the precoding matrix to perform flexible transformation.

In addition, according to this embodiment of the present disclosure, an eavesdropping error rate is improved with reference to a physical layer security technology and an upper-layer cryptographic technique instead of depending on channel information.

It should be understood that the preset precoding matrix may be a precoding matrix that is preset before transmission, or may be a selected optimal precoding matrix. This is not limited in the present disclosure.

It should be further understood that the to-be-decoded information may be information obtained after precoding processing. In this embodiment of the present disclosure, the to-be-decoded information may be the to-be-sent precoded information in FIG. 1.

The performing rotation processing on a preset precoding matrix may obtain the following effect. When a vector is multiplied by a number, a direction of the vector changes but a value of the vector does not change. Rotation processing performed on the precoding matrix may be implemented based on an existing method for performing rotation processing on a matrix. In this embodiment of the present disclosure, the rotation processing performed on the precoding matrix may be implemented in a manner of directly multiplying the precoding matrix by $e^{jw}$ or $e^{-jw}$, where w is an angle of rotation. For example, if $w=\pi$, $e^{jw}$ indicates that the matrix is rotated by 180 degrees in a counterclockwise direction, and $e^{-jw}$ indicates that the matrix is rotated by 180 degrees in a clockwise direction.

It should be understood that, in this embodiment of the present disclosure, the rotation processing may be performed on the precoding matrix at a selected moment. The precoding matrix may not be rotated but may be directly decoded at another moment.

In this embodiment of the present disclosure, the precoding processing may be performed based on linear precoding. After obtaining the to-be-decoded information, the receive end may perform the precoding processing on the preset precoding matrix, and then may decode the to-be-decoded information.

It should be understood that this embodiment of the present disclosure imposes no limitation on a decoding algorithm used by the receive end to perform decoding. The decoding algorithm may be a zero forcing (ZF) algorithm, a minimum mean square error (MMSE) algorithm, a zero forcing serial interference cancellation (ZF-SIC) algorithm, a minimum mean square error serial interference cancellation (MMSE-SIC) algorithm, or the like.

The method for performing rotation on the preset precoding matrix in FIG. 2 may be the same as that in FIG. 1. To avoid repetition, details are not described herein.

Optionally, in another embodiment, the method may further include the following step.

Step 204. Send indication information, where the indication information is used to instruct a base station to perform the rotation processing on the preset precoding matrix.

It should be understood that, in this embodiment of the present disclosure, the indication information may be used to instruct the transmit end (for example, a base station) or the receive end (for example, user equipment) to perform the rotation processing on the preset precoding matrix. The indication information may separately exist in the transmit end and the receive end in a shared manner, and the transmit end includes the same indication information as that included in the receive end. The indication information may indicate that rotation is performed at some moments, and the moments are learned by both the transmit end and the receive end. In this embodiment of the present disclosure, the indication information may be used by the receive end to instruct the transmit end to perform precoding matrix rotation, or the indication information may be used by the transmit end to instruct the receive end to perform precoding matrix rotation. This embodiment of the present disclosure does not impose a limitation thereto.

Optionally, in another embodiment, in step 202, the receive end may obtain indication information, where the indication information is used to instruct the user equipment to perform the rotation processing on the preset precoding matrix, and may perform the rotation processing on the preset precoding matrix according to the indication information.

It should be understood that there are multiple manners of obtaining the indication information. The receive end may perform the rotation processing on the precoding matrix based on indication information shared in advance, or may perform the rotation processing on the precoding matrix based on indication information sent by the transmit end. A manner of obtaining the indication information is not limited in this embodiment of the present disclosure.

Optionally, in another embodiment, the indication information in this embodiment of the present disclosure is carried based on a pseudo random keystream $F=(f_1, f_2, \ldots, f_i, \ldots)$, where $f_i$ is indication information at an $i^{th}$ moment, and $i$ is a real number greater than or equal to zero.

The indication information based on the pseudo random keystream in this embodiment of the present disclosure is the information shared in advance by the transmit end and the receive end. This method is carried based on existing shared information. The method is simple and convenient, and is easy to implement.

In various embodiments, $f_i$ is the indication information at the $i^{th}$ moment, and is used to instruct the precoding matrix to rotate at the $i^{th}$ moment.

Optionally, in another embodiment, the indication information may be one-bit indication information or multi-bit indication information.

According to this embodiment of the present disclosure, multi-bit indication information is used to indicate rotation of the precoding matrix, and is difficult for an eavesdropper to crack. Therefore, system security can be improved.

In various embodiments, the pseudo random keystream $F=(f_1, f_2, \ldots, f_i, \ldots)$ is used to represent the indication information. If the indication information is one-bit indication information, a bit 0 or a bit 1 may be used to indicate whether to rotate the precoding matrix. For example, when $f_i$ is 0, it indicates that the precoding matrix is not rotated at the $i^{th}$ moment; or when $f_i$ is 1, it indicates that the precoding matrix is rotated at the $i^{th}$ moment. If the indication information is multi-bit indication information, multiple bits may be used to indicate whether to rotate the precoding matrix. For example, if the indication information is two-bit indication information, and when $f_{2i}f_{2i\pm1}=00$, it indicates that the precoding matrix is not rotated at the $i^{th}$ moment; or when $f_{2i}f_{2i\pm1}\neq00$, it indicates that the precoding matrix is rotated at the $i^{th}$ moment.

Optionally, in another embodiment, in step 202, the receive end may perform the rotation processing on the preset precoding matrix, so that the preset precoding matrix is rotated by 180 degrees.

According to this embodiment of the present disclosure, the precoding matrix is rotated by 180 degrees, so that an eavesdropping error rate of an eavesdropper can reach the maximum. Therefore, system security is improved.

Optionally, in another embodiment, in step 202, the indication information is one-bit indication information, and the receive end may perform the rotation processing on the preset precoding matrix based on the following formula, so that the preset precoding matrix is rotated by 180 degrees:

$$W_{opt}^i = e^{j\pi f_i} W_{opt},$$

where $W_{opt}$ is the preset precoding matrix, $W_{opt}^i$ is a precoding matrix obtained after rotation processing at an $i^{th}$ moment, $f_i$ is indication information at the $i^{th}$ moment, and $i$ is a real number greater than or equal to zero. In this case, the to-be-decoded information may be represented as $y=He^{j\pi f_i}W_{opt}X+n$. An equivalent spatial channel matrix may be $\overline{H}=HW_{opt}^R=He^{j\pi}W_{opt}$. If the zero forcing algorithm is used to perform decoding, $\overline{H}^+=[\overline{H}^H\overline{H}]^{-1}\overline{H}^H$. In this case, a finally determined signal may be obtained, and the signal may be $\tilde{X}=\overline{H}^+y=\overline{H}^+\overline{H}X+\overline{H}^+n=X+\overline{H}^+n$.

In addition, for an eavesdropper, the eavesdropper does not know the indication information. Therefore, the eavesdropper may perform detection according to a precoding matrix before rotation, or may perform detection by guessing the indication information $(f_1^g, f_2^g, K, f_i^g, K)$. However, an error rate of guessing the indication information by the eavesdropper reaches 0.5.

In this embodiment of the present disclosure, an example in which the precoding matrix is rotated by 180 degrees is used to describe an eavesdropping error rate.

If $f_i^g=0$, and it is assumed in this case that indication information of the transmitter is $f_i=0$, the eavesdropper can obtain a true transmit signal; or if $f_i=1$ in this case, a real signal received by the eavesdropper is $y=HW_{opt}^RX+n$, where $W_{opt}^R=e^{j\pi}W_{opt}$. A detection process is as follows.

(1) The eavesdropper guesses the indication information, and the eavesdropper mistakes a real precoding matrix $W_{opt}^R$ for $W_{opt}$.

(2) Consider an equivalent channel matrix as: $H=HW_{opt}=He^{j\pi}W_{opt}^R$.

(3) The eavesdropper uses a zero forcing detection algorithm: $\overline{H}^+=[\overline{H}^H\overline{H}]^{-1}\overline{H}^H$.

(4) A finally determined signal is: $\tilde{X}=\overline{H}^+y=\overline{H}^+e^{j\pi}\overline{H}X+\overline{H}^+n=e^{j\pi}X+\overline{H}^+n$.

In this case, a transmit signal determined by the eavesdropper has a value obtained by rotating an original transmit signal constellation point by 180 degrees, and the transmit signal has a maximum error rate.

If $f_i^g=1$, and it is assumed in this case that indication information of the transmitter is $f_i=1$, the eavesdropper can obtain a true transmit signal; or if $f_i=0$ in this case, a real signal received by the eavesdropper is $y=HW_{opt}X+n$, where $W_{opt}^R=e^{j\pi}W_{opt}$. A detection process is as follows.

(1) The eavesdropper guesses the indication information, and the eavesdropper mistakes a real precoding matrix $W_{opt}$ for $W_{opt}^R$.

(2) Consider an equivalent channel matrix as: $\overline{H}=HW_{opt}^R=He^{j\pi}W_{opt}$.

(3) The eavesdropper uses a zero forcing detection algorithm: $\overline{H}^+=[\overline{H}^H\overline{H}]^{-1}\overline{H}^H$.

(4) A finally determined signal is: $\tilde{X}=\overline{H}^+y=e^{j\pi}\overline{H}^+\overline{H}X+\overline{H}^+n=e^{j\pi}X+\overline{H}+n$.

In this case, a transmit signal determined by the eavesdropper has a value obtained by rotating an original transmit signal constellation point by 180 degrees, and the transmit signal has a maximum error rate.

Therefore, when $f_i^g$ is different from $f_i$, the transmit signal determined by the eavesdropper has a value obtained by rotating an original transmit signal constellation point by 180 degrees. According to a constellation point feature, use of this solution causes worst eavesdropping performance during multiple phase-shift keying (M-PSK) modulation.

Figure 3:
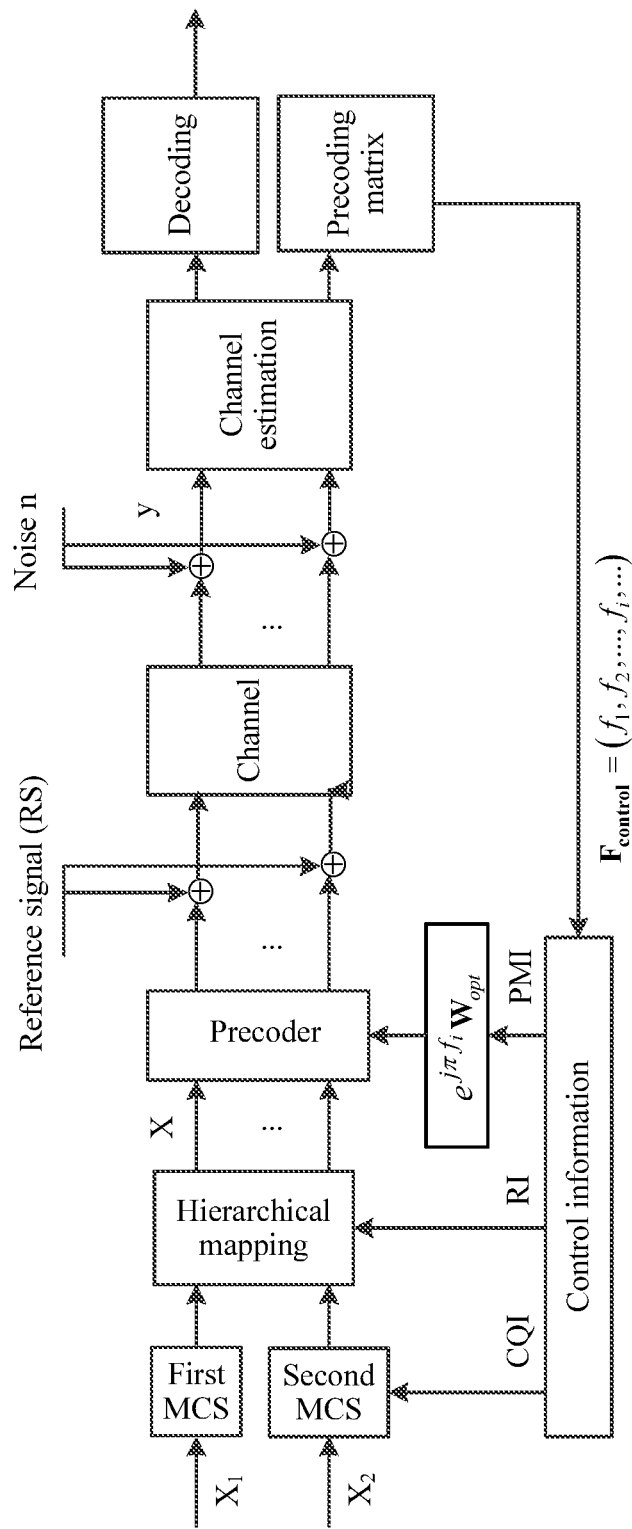
FIG. 3 is a schematic diagram of a data transmission process according to an embodiment of the present disclosure.

FIG. 3 is a schematic diagram of a data transmission process according to an embodiment of the present disclosure. A limited-feedback precoding process based on a codebook in a cross-layer security process shown in FIG. 3 may be as follows.

(1) Hierarchically map inputted spatial multiplexing code words $X_1$ and $X_2$ by respectively using a first modulation and coding scheme (MCS) and a second MCS, to obtain a space time coding matrix X, where X is a M×T-dimensional matrix, M indicates a quantity of data stream layers, and T is a quantity of transmit periods.

(2) Multiply the space time coding matrix X by an $N_t$×M-dimensional precoding matrix $W_{opt}$ using a precoder before transmission, where $W_{opt}X$ indicates that space time symbols of M layers are mapped to $N_t$ transmit antennas.

(3) Control information includes a channel quality indicator (CQI), a rank indicator (RI), and a precoding matrix indicator (PMI), where the CQI is sent to the MCS, the RI is sent to a hierarchical mapping, and the PMI is sent to the precoder. In addition, indication information is set based on a pseudo random keystream $F_{control}=(f_1, f_2, \ldots, f_i, \ldots)$, and a precoding matrix is multiplied by $e^{j\pi f_i}$, where $f_i$ is indication information at an $i^{th}$ moment and may be used to indicate whether to rotate the precoding matrix by 180 degrees.

(4) Transmit a pilot signal (RS). The pilot signal reaches a receive end by passing through a fading channel to perform channel estimation. After a precoding matrix selection process, a signal finally received by the receive end is:

$$y=He^{j\pi f_i}W_{opt}X+n,$$

where H is channel information, $W_{opt}$ is the precoding matrix, and n is an additive white Gaussian noise. In addition, a value of $f_i$ corresponds to an angle of rotation of the precoding matrix. When $f_i=0$, it indicates that a transmit end selects a precoding matrix $W_{opt}$ at the $i^{th}$ moment; or when $f_i=1$, it indicates that a transmit end selects a precoding matrix $W_{opt}^R$ at the $i^{th}$ moment, where $W_{opt}^R=e^{j\pi}W_{opt}$.

(5) When $f_i=0$, the receive end learns that the precoding matrix is not rotated, and obtains a true transmit signal X.

(6) When $f_i=0$, the receive end learns that the precoding matrix is rotated by 180 degrees. In this case, an equivalent spatial channel matrix is determined as: $\overline{H}=HW_{opt}^R=He^{j\pi}W_{opt}$.

(7) The receive end performs decoding.

For ease of description, the decoding herein is performed using a zero forcing algorithm, and a linear association coefficient matrix is:

$$\overline{H}^+=[\overline{H}^H\overline{H}]^{-1}\overline{H}^H.$$

(8) Detect a transmit signal and the transmit signal is:

$$\tilde{X}=\overline{H}^+y=\overline{H}^+\overline{H}X+\overline{H}^+n=X+\overline{H}^+n.$$

Figure 4:
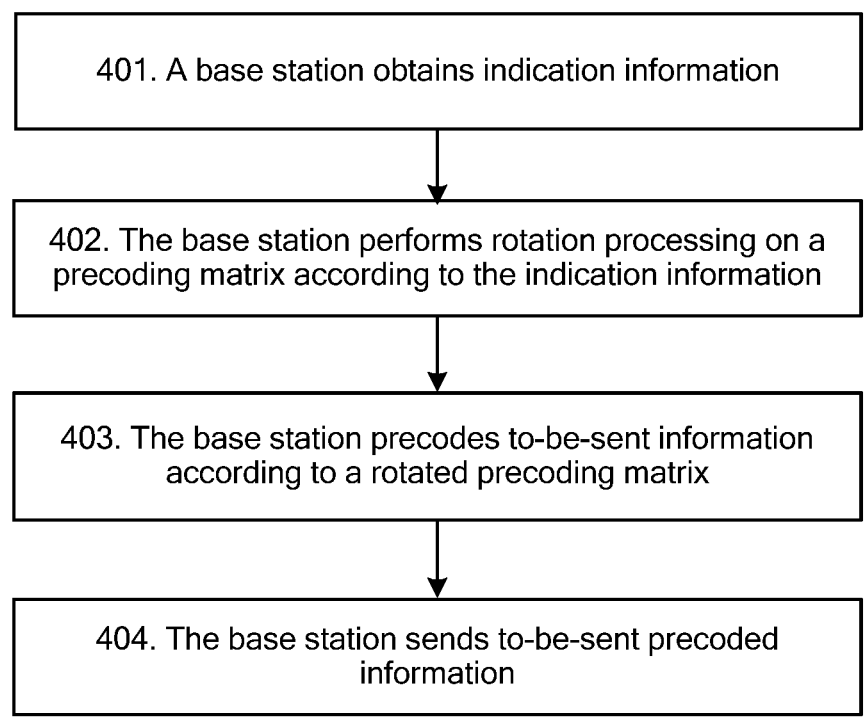
FIG. 4 is a schematic flowchart of a data transmission process according to another embodiment of the present disclosure.

FIG. 4 is a schematic flowchart of a data transmission process according to another embodiment of the present disclosure. Indication information in FIG. 4 is one-bit indication information. The data transmission process in FIG. 4 may be performed by a transmit end, and the transmit end may be a base station. The process includes the following steps.

Step 401. The base station obtains indication information.

The indication information is set based on a pseudo random keystream $F_{control}=(f_1, f_2, \ldots, f_i, \ldots)$. When $f_i=0$, it indicates that the transmit end rotates a precoding matrix by 0 degrees at an $i^{th}$ moment; or when $f_i=1$, it indicates that the transmit end rotates a precoding matrix by 180 degrees at an $i^{th}$ moment.

Step 402. The base station performs rotation processing on a precoding matrix according to the indication information.

Step 403. The base station precodes to-be-sent information according to a rotated precoding matrix.

After a precoding selection process, final to-be-sent information obtained after the precoding processing is:

$$y=He^{j\pi f_i}W_{opt}X+n,$$

where H is channel information, $W_{opt}$ is the precoding matrix, and n is an additive white Gaussian noise. In addition, a value of $f_i$ corresponds to an angle of rotation of the precoding matrix. When $f_i=0$, it indicates that the transmit end selects a precoding matrix $W_{opt}$ at the $i^{th}$ moment; or when $f_i=1$, it indicates that the transmit end selects a precoding matrix $W_{opt}^R$ at the $i^{th}$ moment, where $W_{opt}^R=e^{j\pi}W_{opt}$.

404. The base station sends to-be-sent precoded information.

In this embodiment of the present disclosure, indication information shared by a transmit end and a receive end is used to indicate whether to rotate a precoding matrix, and to-be-decoded information is decoded according to the indication information. The transmit end and the receive end in this method learn the indication information in advance, and system security is improved by instructing the precoding matrix to perform flexible transformation.

In addition, according to this embodiment of the present disclosure, an eavesdropping error rate is improved with reference to a physical layer security technology and an upper-layer cryptographic technique instead of depending much on channel information.

It should be understood that this embodiment of the present disclosure imposes no limitation on a decoding algorithm used by the receive end to perform decoding. The decoding algorithm may be a ZF algorithm, an MMSE algorithm, a ZF-SIC algorithm, an MMSE-SIC algorithm, or the like.

Figure 5:
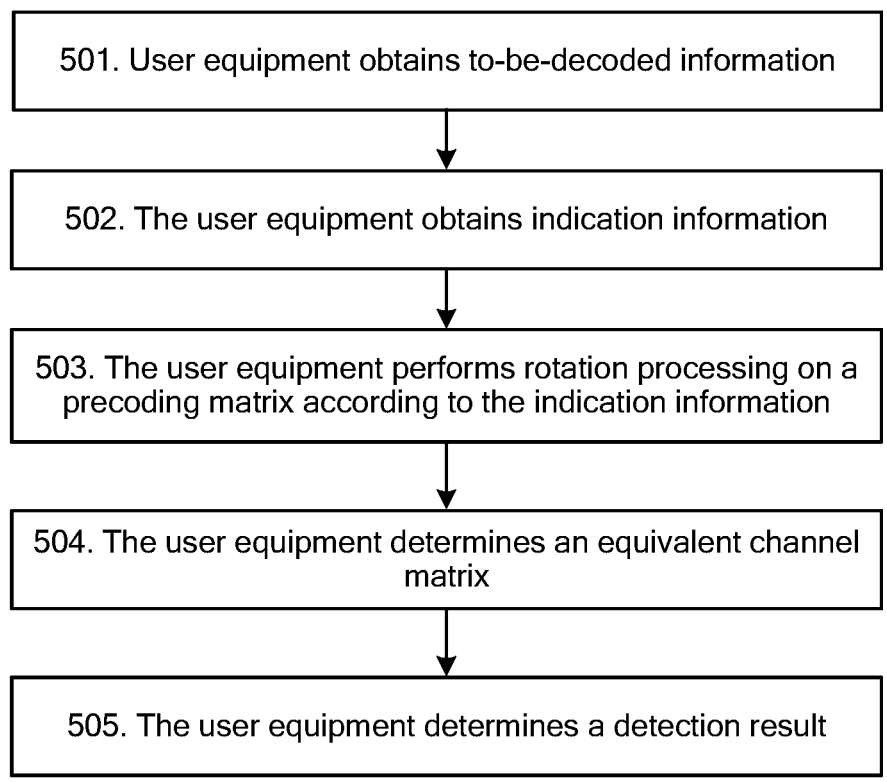
FIG. 5 is a schematic flowchart of a data transmission process according to another embodiment of the present disclosure.

The following describes a decoding process in detail based on a zero forcing algorithm with reference to FIG. 5.

FIG. 5 is a schematic flowchart of a data transmission process according to another embodiment of the present disclosure. Indication information in FIG. 5 is one-bit indication information. The process in FIG. 5 may be performed by a receive end, and the receive end may be user equipment. The process includes the following steps.

Step 501. The user equipment obtains to-be-decoded information.

It should be understood that the to-be-sent precoded information sent in step 404 in FIG. 4 is the to-be-decoded information obtained by the user equipment in step 501. The to-be-decoded information is $y = He^{j\pi f_i} W_{opt} X + n$.

Step 502. The user equipment obtains indication information.

Step 503. The user equipment performs rotation processing on a precoding matrix according to the indication information.

The indication information is set based on a pseudo random keystream $F_{control} = (f_1, f_2, \ldots, f_i, \ldots)$. When $f_i = 1$, it indicates that a transmit end rotates the precoding matrix by 0 degrees at an $i^{th}$ moment; or when $f_i = 1$, it indicates that a transmit end rotates the precoding matrix by 180 degrees at an $i^{th}$ moment. A formula for performing rotation on the precoding matrix may be as follows: $W_{opt}^i = e^{j\pi f_i} W_{opt}$, where $W_{opt}$ is a preset precoding matrix, $W_{opt}^i$ is a precoding matrix obtained after rotation processing at an $i^{th}$ moment, $f_i$ is indication information at the $i^{th}$ moment, and i is a real number greater than or equal to zero.

Step 504. The user equipment determines an equivalent channel matrix.

The equivalent channel matrix is $\overline{H} = H W_{opt}^R = He^{j\pi x} W_{opt}$.

Step 505. The user equipment determines a detection result.

A detection step may be: $\tilde{X} = \overline{H}^+ y = \overline{H}^+ \overline{H} X + \overline{H}^+ n = X + \overline{H}^+ n$.

In this embodiment of the present disclosure, indication information shared by a transmit end and a receive end is used to indicate whether to rotate a precoding matrix, and to-be-decoded information is decoded according to the indication information. The transmit end and the receive end in this method learn the indication information in advance, and system security is improved by instructing the precoding matrix to perform flexible transformation.

In addition, according to this embodiment of the present disclosure, an eavesdropping error rate is improved with reference to a physical layer security technology and an upper-layer cryptographic technique instead of depending on channel information.

It should be understood that a precoding method and a decoding method in this embodiment of the present disclosure may be applied to multiple secure transmission systems. For ease of description, only a zero forcing algorithm is used as a decoding algorithm in this embodiment of the present disclosure. Descriptions are separately provided in the following with reference to specific embodiments.

Optionally, in an embodiment, this embodiment of the present disclosure may be implemented based on a DFT codebook. A specific implementation manner is as follows.

(1) Set a DFT codebook used by a system to:

$$E_{DFT} = \{W_1, \theta W_1, L\theta^{L-1} W_1\},$$

where this codebook has L precoding matrices in total, and it is assumed that L=64.

(2) Set an element in a $k^{th}$ row and an $l^{th}$ column in an $N_t \times N_t$-dimensional DFT matrix to:

$$e^{j2\pi(k-1)(l-1)/N_t}/\sqrt{N_t}, \; (k,l=1,2,LN_t).$$

A first column and a second column are selected from the $N_t \times N_t$-dimensional DFT matrix, and a first precoding matrix $W_1$ is obtained:

$$W_1 = \frac{1}{\sqrt{4}} \begin{bmatrix} 1 & 1 \\ 1 & e^{j2\pi \cdot 1 \cdot 1/4} \\ 1 & e^{j2\pi \cdot 1 \cdot 2/4} \\ 1 & e^{j2\pi \cdot 1 \cdot 3/4} \end{bmatrix} = \begin{bmatrix} 0.5 & 0.5 \\ 0.5 & 0.5i \\ 0.5 & -0.5 \\ 0.5 & -0.5i \end{bmatrix}.$$

(3) Determine a diagonal matrix $\theta$:

$$\theta = \text{diag}\left(\left[ e^{j2\pi u_1/L} \; e^{j2\pi u_2/L} \; L \; e^{j2\pi u_{N_t}/L} \right]\right).$$

(4) Determine a rotation vector.

$\{u_i\}_{i=1}^{N_t}$ is an undetermined variable, and after the first precoding matrix $W_i$ is given, the rotation vector is determined by maximizing a minimum chord distance:

$$u = \underset{\{u_1, u_2, L, u_{N_t}\}}{\arg\max} \; \underset{l=1,2,L,L-1}{\min} d(W_1, \theta^l W_1).$$

If a value of the rotation vector is as follows:

$$u = [1, 7, 52, 56],$$

$\theta$ is:

$$\theta = \text{diag}\left(\left[ e^{j2\pi \cdot 1/64}, e^{j2\pi \cdot 7/64}, e^{j2\pi \cdot 52/64}, e^{j2\pi \cdot 56/64} \right]\right)$$

$$= \begin{bmatrix} 0.9952 + 0.0980i & 0 & 0 & 0 \\ 0 & 0.7730 + 0.6344i & 0 & 0 \\ 0 & 0 & 0.3827 - 0.9239i & 0 \\ 0 & 0 & 0 & 0.7071 - 0.7071i \end{bmatrix};$$

and all remaining precoding matrices $W_i$ are:

$$W_i = \theta^{i-1} W_1, \; i=2,3,L,64.$$

(5) Design a channel matrix in an $i^{th}$ timeslot.

In this embodiment of the present disclosure, four transmit antennas and two receive antennas are used, and the channel matrix in the $i^{th}$ timeslot is:

$$H = \begin{bmatrix} h_{1,1} & h_{1,2} & h_{1,3} & h_{1,4} \\ h_{2,1} & h_{2,2} & h_{2,3} & h_{2,4} \end{bmatrix}$$

$$= \begin{bmatrix} 0.7071+0.0468i & -0.4172+0.2313i & 0.2989+0.7114i & 0.3335+0.1818i \\ -1.1767+0.4613i & -0.1966+0.7655i & -1.1810-0.4603i & -0.8576-0.6678i \end{bmatrix}.$$

(6) Select an optimal precoding matrix.

After performing ideal channel estimation, the receive end selects, according to the following precoding matrix selection criterion, an optimal precoding matrix that adapts to a current channel, and the optimal precoding matrix is:

$$W_{opt} = \theta^{14} W_1$$

$$= \begin{bmatrix} 0.0975+0.4904i & 0.0975+0.4904i \\ -0.4904-0.0975i & 0.0975-0.4904i \\ -0.3536+0.3536i & 0.3536-0.3536i \\ 0.0000+0.5000i & 0.5000-0.0000i \end{bmatrix}.$$

A precoding matrix that is most appropriate for a current channel matrix may be obtained with reference to the foregoing two formulas, and the precoding matrix is:

$$W_{opt} = \arg\max_{W_i \in E_{DFT}} \| HW_i \|_F^2.$$

(7) Determine a received signal.

A feedback process of the receive end is correct, a precoding matrix used by the transmit end is consistent with a precoding matrix selected by the receive end, and a received signal in the $i^{th}$ timeslot is:

$$y = HW_{opt}X + n$$

(8) Determine an equivalent spatial channel matrix as:

$$\overline{H} = HW_{opt}$$

$$= \begin{bmatrix} -0.1749+0.2995i & 0.6427+0.8152i \\ 0.7443-1.5719i & -0.9938-0.4400i \end{bmatrix}.$$

(9) Perform decoding on the signal.

The system uses the zero forcing algorithm, and a linear association coefficient matrix is:

$$\overline{H}^+ = [\overline{H}^H \overline{H}]^{-1} \overline{H}^H$$

$$= \begin{bmatrix} 0.6354+0.3825i & 0.3657+0.6066i \\ 0.6376-1.0008i & 0.1439-0.1879i \end{bmatrix}.$$

A detection result of a transmit signal is:

$$\tilde{X} = \overline{H}^+ y = \overline{H}^+ \overline{H} X + \overline{H}^+ n = X + \overline{H}^+ n.$$

The foregoing steps (1) to (9) are an existing common process based on the DFT codebook. The following describes a method in this embodiment of the present disclosure that is applied to the common process, that is, a cross-layer security process based on the DFT codebook in this embodiment of the present disclosure. Specific steps in this embodiment of the present disclosure may be as follows.

A process for a transmitter (a base station) is as follows.

(1) The transmitter and a receiver share a pseudo random keystream in advance:

$$F_{control} = (f_1, f_2, \ldots, f_i, \ldots).$$

When $f_i=0$, it indicates that the precoding matrix is rotated by 0 degrees at an $i^{th}$ moment; or when $f_i=1$, it indicates that the precoding matrix is rotated by 180 degrees at an $i^{th}$ moment.

(2) Channel information does not change, and an optimal precoding matrix in an $i^{th}$ timeslot does not change and still is:

$$W_{opt} = \theta^{14} W_1$$

$$= \begin{bmatrix} 0.0975+0.4904i & 0.0975+0.4904i \\ -0.4904-0.0975i & 0.0975-0.4904i \\ -0.3536+0.3536i & 0.3536-0.3536i \\ 0.0000+0.5000i & 0.5000-0.0000i \end{bmatrix}.$$

(3) Perform rotation processing on the precoding matrix.

The rotation processing may be that the precoding matrix is rotated by 180 degrees, or may be that the precoding matrix is rotated by 0 degrees. An objective of layer crossing in this embodiment of the present disclosure is, under indication of the pseudo random keystream, a precoding matrix selected by the transmit end in the $i^{th}$ timeslot is changed into:

$$W_{opt}^i = e^{j\pi f_i} W_{opt}$$

$$= e^{j\pi f_i} \begin{bmatrix} 0.0975+0.4904i & 0.0975+0.4904i \\ -0.4904-0.0975i & 0.0975-0.4904i \\ -0.3536+0.3536i & 0.3536-0.3536i \\ 0.0000+0.5000i & 0.5000-0.0000i \end{bmatrix}.$$

(4) When $f_i=1$, the precoding matrix is rotated by 180 degrees. A rotated precoding matrix is:

$$W_{opt}^R = e^{j\pi} W_{opt}$$

$$= \begin{bmatrix} -0.0975-0.4904i & -0.0975-0.4904i \\ 0.4904+0.0975i & -0.0975+0.4904i \\ 0.3536-0.3536i & -0.3536+0.3536i \\ -0.0000-0.5000i & -0.5000+0.0000i \end{bmatrix}.$$

(5) When $f_i=1$, a signal received by the receive end is:

$$y = HW_{opt}^R X + n.$$

A process for an authorized receiver (user equipment) is as follows.

(1) A transmitter and the receiver share a pseudo random keystream in advance.

When $f_i=0$, it indicates that the precoding matrix is rotated by 0 degrees at an $i^{th}$ moment; or when $f_i=1$, it indicates that the precoding matrix is rotated by 180 degrees at an $i^{th}$ moment.

(2) If $f_i=0$, the authorized receiver obtains a true transmit signal according to an existing common method; or if $f_i=1$, the authorized receive end learns that the precoding matrix has been rotated by 180 degrees, and in this case, a signal obtained by the receive end is:

$$y=HW_{opt}^R X+n.$$

(3) An equivalent channel matrix is:

$$\overline{H} = HW_{opt}^R = e^{j\pi} HW_{opt}$$
$$= \begin{bmatrix} 0.1749 - 0.2995i & -0.6427 - 0.8152i \\ -0.7443 + 1.5719i & 0.9938 + 0.4400i \end{bmatrix}.$$

(4) Detect a signal based on a zero forcing algorithm.

An association coefficient matrix in the zero forcing algorithm is:

$$\overline{H}^+ = [\overline{H}^H \overline{H}]^{-1} \overline{H}^H = e^{j\pi} \overline{H}^+$$
$$= \begin{bmatrix} -0.6354 - 0.3825i & -0.3657 - 0.6066i \\ -0.6376 + 1.0008i & -0.1439 + 0.1879i \end{bmatrix}.$$

A detection result is:

$$\overset{\%}{X} = \overline{H}^+ y$$
$$= \overline{H}^+ HW_{opt}^R X + \overline{H}^+ n$$
$$= \overline{H}^+ \overline{H} X + \overline{H}^+ n$$
$$= \begin{bmatrix} -0.6354 - 0.3825i & -0.3657 - 0.6066i \\ -0.6376 + 1.0008i & -0.1439 + 0.1879i \end{bmatrix} \begin{bmatrix} 0.1749 - 0.2995i & -0.6427 - 0.8152i \\ -0.7443 + 1.5719i & 0.9938 + 0.4400i \end{bmatrix} X + \overline{H}^+ n$$
$$= X + \overline{H}^+ n.$$

Therefore, the authorized receive end obtains the transmit signal by performing correct decoding using the foregoing steps (1) to (4).

A process for an eavesdropper is as follows.

(1) A pseudo-random sequence guessed by the eavesdropper is:

$$F_{control}^g = (f_1^g, f_2^g, \ldots, f_i^g, \ldots).$$

(2) If $f_i^g=0$, and it is assumed in this case that indication information of a transmitter is $f_i=0$, the eavesdropper can obtain a true transmit signal; or if $f_i=1$ in this case, a real signal received by the eavesdropper is $y=HW_{opt}^R X+n$, where $W_{opt}^R=e^{j\pi}W_{opt}$. A detection process is as follows. The eavesdropper guesses the indication information, and the eavesdropper mistakes a real precoding matrix $W_{opt}^R$ for $W_{opt}$; an equivalent channel matrix is considered as:

$$\overline{H} = HW_{opt} = \begin{bmatrix} -0.1749 + 0.2995i & 0.6427 + 0.8152i \\ 0.7443 - 1.5719i & -0.9938 - 0.4400i \end{bmatrix};$$

a zero forcing detection algorithm is used:

$$\overline{H}^+ = [\overline{H}^H \overline{H}]^{-1} \overline{H}^H = \begin{bmatrix} 0.6354 + 0.3825i & 0.3657 + 0.6066i \\ 0.6376 - 1.0008i & 0.1439 - 0.1879i \end{bmatrix};$$

and a finally detected signal is:

$$\overset{\%}{X} = \overline{H}^+ y = \overline{H}^+ HW_{opt}^R X + \overline{H}^+ n$$
$$= \overline{H}^+ e^{j\pi} \overline{H} X + \overline{H}^+ n$$
$$= e^{j\pi} X + \overline{H}^+ n.$$

In this case, a detection result is a result obtained after an original transmit signal is rotated by 180 degrees, and the detection result has a maximum error rate.

(3) If $f_i^g=1$, and it is assumed in this case that indication information of a transmitter is $f_i=1$, the eavesdropper can obtain a true transmit signal; or if $f_i=0$ in this case, a real signal received by the eavesdropper is $y=HW_{opt}X+n$, where $W_{opt}^R=e^{j\pi}W_{opt}$. A detection process is as follows.

The eavesdropper guesses the indication information, and the eavesdropper mistakes a real precoding matrix $W_{opt}$ for $W_{opt}^R$;

an equivalent channel matrix is considered as:

$$\overline{H} = HW_{opt}^R$$
$$= \begin{bmatrix} 0.1749 - 0.2995i & -0.6427 - 0.8152i \\ -0.7443 + 1.5719i & 0.9938 + 0.4400i \end{bmatrix};$$

the eavesdropper uses a zero forcing detection algorithm:

$$\overline{H}^+ = [\overline{H}^H \overline{H}]^{-1} \overline{H}^H$$
$$= \begin{bmatrix} -0.6354 - 0.3825i & -0.3657 - 0.6066i \\ -0.6376 + 1.0008i & -0.1439 + 0.1879i \end{bmatrix};$$

and a finally detected signal is:

$$\tilde{X} = \overline{H}^+ y = e^{j\pi} \overline{H}^+ \overline{H} X + \overline{H}^+ n = e^{j\pi} X + \overline{H}^+ n.$$

In this case, a transmit signal determined by the eavesdropper has a value obtained by rotating an original transmit signal constellation point by 180 degrees, and the transmit signal has a maximum error rate.

Optionally, in an embodiment, this embodiment of the present disclosure may be implemented based on a TxAA codebook. A specific implementation manner is as follows.

(1) Design a precoding matrix in a TxAA mode.

In the TxAA mode, phases of a second antenna, a third antenna, and a fourth antenna relative to a first antenna are adjusted to obtain the precoding matrix:

$$E_{TxAA} = \{W_1, W_2, L\ W_L\} = \frac{1}{2}\begin{bmatrix} 1 \\ e^{j\varphi_2} \\ e^{j\varphi_3} \\ e^{j\varphi_4} \end{bmatrix},$$

where $\varphi_2$, $\varphi_3$, and $\varphi_4$ are phase adjustment values of the second antenna, the third antenna, and the fourth antenna. Herein, values of $\varphi_2$, $\varphi_3$, and $\varphi_4$ may be:

$$\left\{0\ \frac{\pi}{2}\ \pi\ \frac{3\pi}{2}\right\}.$$

In addition, a size of the codebook may be L=64.

(2) Design a channel matrix in an $i^{th}$ timeslot.

In this embodiment of the present disclosure, four transmit antennas and two receive antennas are used, and the channel matrix in the $i^{th}$ timeslot is:

$$H = \begin{bmatrix} h_{1,1} & h_{1,2} & h_{1,3} & h_{1,4} \\ h_{2,1} & h_{2,2} & h_{2,3} & h_{2,4} \end{bmatrix}$$

$$= \begin{bmatrix} 0.2535+1.1191i & -0.2578+0.2147i & 0.1565+0.5681i & -0.2094-0.1936i \\ 0.0256+1.9299i & 1.2523-0.5588i & 1.9307-0.9333i & 0.3990+0.1922i \end{bmatrix}.$$

(3) Select an optimal precoding matrix.

After performing ideal channel estimation, the receive end selects, according to the following precoding matrix selection criterion, an optimal precoding matrix that adapts to a current channel, and the optimal precoding matrix is:

$$W_{opt} = \arg\max_{W_i \in E_{TxAA}} \|HW_i\|_F^2.$$

A precoding matrix that is most appropriate for a current channel matrix may be obtained with reference to the foregoing two formulas, and the precoding matrix is:

$$W_{opt} = W_{21} = \begin{bmatrix} 0.5 \\ 0.5i \\ 0.5i \\ 0.5 \end{bmatrix}.$$

(4) Determine a received signal.

A feedback process of the receive end is correct, a precoding matrix used by the transmit end is consistent with a precoding matrix selected by the receive end, and a received signal in the $i^{th}$ timeslot is:

$$y = HW_{opt}X + n.$$

(5) Determine an equivalent spatial channel matrix as:

$$\overline{H} = HW_{opt}$$

$$= \begin{bmatrix} -0.3693+0.4120i \\ 0.9584+2.6525i \end{bmatrix}.$$

(6) Perform decoding on the signal.

The system uses the zero forcing algorithm, and a linear association coefficient matrix is:

$$\overline{H}^+ = [\overline{H}^H \overline{H}]^{-1} \overline{H}^H$$

$$= [-0.0447 - 0.0499i\ 0.1160 - 0.3211i].$$

A detection result of a transmit signal is:

$$\tilde{X} = \overline{H}^+ y = \overline{H}^+ \overline{H} X + \overline{H}^+ n = X + \overline{H}^+ n.$$

The foregoing steps (1) to (6) are an existing common process based on the codebook in the TxAA mode. The following describes a method in this embodiment of the present disclosure that is applied to the common process, that is, a cross-layer security process based on the codebook in the TxAA mode in this embodiment of the present disclosure. Specific steps in this embodiment of the present disclosure may be as follows.

A process based on a transmitter (a base station) is as follows.

(1) The transmitter and a receiver share a pseudo random keystream in advance:

$$F_{control} = (f_1, f_2, \ldots, f_i, \ldots).$$

When $f_i=0$, it indicates that the precoding matrix is rotated by 0 degrees at an $i^{th}$ moment; or when $f_i=1$, it indicates that the precoding matrix is rotated by 180 degrees at an $i^{th}$ moment.

(2) Channel information does not change, and an optimal precoding matrix in an $i^{th}$ timeslot does not change and still is:

$$W_{opt} = W_{21} = \begin{bmatrix} 0.5 \\ 0.5i \\ 0.5i \\ 0.5 \end{bmatrix}.$$

(3) Perform rotation processing on the precoding matrix.

The rotation processing may be that the precoding matrix is rotated by 180 degrees, or may be that the precoding matrix is rotated by 0 degrees. An objective of layer crossing in this embodiment of the present disclosure is, under indication of the pseudo random keystream, a precoding matrix selected by the transmit end in the $i^{th}$ timeslot is changed into:

$$W_{opt}^i = e^{j\pi f_i} W_{opt} = e^{j\pi f_i} \begin{bmatrix} 0.5 \\ 0.5i \\ 0.5i \\ 0.5 \end{bmatrix}.$$

(4) When $f_i=1$, the precoding matrix is rotated by 180 degrees. A rotated precoding matrix is:

$$W_{opt}^R = e^{j\pi} W_{opt} = \begin{bmatrix} -0.5 \\ -0.5i \\ -0.5i \\ -0.5 \end{bmatrix}.$$

(5) When $f_i=1$, a signal received by the receive end is:

$$y = HW_{opt}^R X + n.$$

A process for an authorized receiver (user equipment) is as follows.

(1) A transmitter and the receiver share a pseudo random keystream in advance.

When $f_i=0$, it indicates that the precoding matrix is rotated by 0 degrees at an $i^{th}$ moment; or when $f_i=1$, it indicates that the precoding matrix is rotated by 180 degrees at an $i^{th}$ moment.

(2) If $f_i=0$, the authorized receive end obtains a true transmit signal according to an existing common method; or if $f_i=1$, the authorized receive end learns that the precoding matrix has been rotated by 180 degrees, and in this case, a signal obtained by the receive end is:

$$y = HW_{opt}^R X + n.$$

(3) An equivalent channel matrix is:

$$\overline{H} = HW_{opt}^R = e^{j\pi} HW_{opt}$$
$$= \begin{bmatrix} 0.3693 - 0.4120i \\ -0.9584 - 2.6525i \end{bmatrix}.$$

(4) Detect a signal based on a zero forcing algorithm.

An association coefficient matrix in the zero forcing algorithm is:

$$\overline{H}^+ = [\overline{H}^H \overline{H}]^{-1} \overline{H}^H = e^{j\pi} \overline{H}^+$$
$$= [0.0447 + 0.0499i \quad -0.1160 + 0.3211i].$$

A detection result is:

$$\tilde{X} = \overline{H}^+ y$$
$$= \overline{H}^+ HW_{opt}^R X + \overline{H}^+ n$$
$$= \overline{H}^+ \overline{H} X + \overline{H}^+ n$$
$$= [0.0447 + 0.0499i \quad -0.1160 + 0.3211i] \begin{bmatrix} 0.3693 - 0.4120i \\ -0.9854 - 2.6525i \end{bmatrix} X + \overline{H}^+ n$$
$$= X + \overline{H}^+ n.$$

Therefore, the authorized receive end obtains the transmit signal by performing correct decoding using the foregoing steps (1) to (4).

A process for an eavesdropper is as follows.

(1) A pseudo-random sequence guessed by the eavesdropper is:

$$F_{control}^g = (f_1^g, f_2^g, \ldots, f_i^g, \ldots).$$

(2) If $f_i^g=0$, and it is assumed in this case that indication information of a transmitter is $f_i=0$, the eavesdropper can obtain a true transmit signal; or if $f_i=1$ in this case, a real signal received by the eavesdropper is $y=HW_{opt}^R X+n$, where $W_{opt}^R=e^{j\pi}W_{opt}$. A detection process is as follows. The eavesdropper guesses the indication information, and the eavesdropper mistakes a real precoding matrix $W_{opt}^R$ for $W_{opt}$; an equivalent channel matrix is considered as:

$$\overline{H} = HW_{opt} = \begin{bmatrix} -0.3693 + 0.4120i \\ 0.9584 + 2.6525i \end{bmatrix};$$

a zero forcing detection algorithm is used:

$$\overline{H}^+ = [\overline{H}^H \overline{H}]^{-1} \overline{H}^H = [-0.0447 - 0.0499i \quad 0.1160 - 0.3211i];$$
and a finally detected signal is:

$$\tilde{X} = \overline{H}^+ y = \overline{H}^+ HW_{opt}^R X + \overline{H}^+ n$$
$$= \overline{H}^+ e^{j\pi} \overline{H} X + \overline{H}^+ n$$
$$= e^{j\pi} X + \overline{H}^+ n.$$

In this case, a detection result is a result obtained after an original transmit signal is rotated by 180 degrees, and the detection result has a maximum error rate.

(3) If $f_i^g=1$, and it is assumed in this case that indication information of a transmitter is $f_i=1$, the eavesdropper can obtain a true transmit signal; or if $f_i=0$ in this case, a real signal received by the eavesdropper is $y=HW_{opt}X+n$, where $W_{opt}^R=e^{j\pi}W_{opt}$. A detection process is as follows.

The eavesdropper guesses the indication information, and the eavesdropper mistakes a real precoding matrix $W_{opt}$ for $W_{opt}^R$;

an equivalent channel matrix is considered as:

$$\overline{H} = HW_{opt}^R$$
$$= \begin{bmatrix} 0.3693 - 0.4120i \\ -0.9584 - 2.6525i \end{bmatrix};$$

the eavesdropper uses a zero forcing detection algorithm:

$$\overline{H}^+ = [\overline{H}^H \overline{H}]^{-1} \overline{H}^H$$
$$= [0.0447 + 0.0499i \quad -0.1160 + 0.3211i];$$

and a finally detected signal is:

$$\tilde{X} = \overline{H}^+ y = e^{j\pi} \overline{H}^+ \overline{H} X + \overline{H}^+ n = e^{j\pi} X + \overline{H}^+ n.$$

In this case, a transmit signal determined by the eavesdropper has a value obtained by rotating an original transmit signal constellation point by 180 degrees, and the transmit signal has a maximum error rate.

Optionally, in an embodiment, this embodiment of the present disclosure may be implemented based on open-loop spatial multiplexing precoding based on a large delay CDD. A specific implementation manner is as follows.

In open-loop spatial multiplexing, no PMI needs to be fed back. Only one difference between an open loop and a closed loop is that precoding matrices are different.

(1) Based on a definition in an LTE protocol, cyclic delay diversity precoding is performed in the following mode:

$$\begin{bmatrix} p^{(0)}(i) \\ M \\ y^{(p-1)}(i) \end{bmatrix} = [W(i)D(i)U] \cdot \begin{bmatrix} x^{(0)}(i) \\ M \\ x^{(M-1)}(i) \end{bmatrix},$$

where

W(i) is an $N_t \times M$-order precoding matrix, D(i) and U are $M \times M$-order matrices that support cyclic delay diversity, and i is an index of a carrier.

When $N_t=4$ (that is, ports of four antennas of a base station are configured), W(i)=$C_k$, where $$k = \left(\left\lfloor \frac{i}{M} \right\rfloor \bmod 4\right) + 1.$$

That is, within a schedulable frequency band, the base station cyclically allocates a fixed codebook as a weighted value W(i) of precoding.

(2) Determine a received signal.

The precoding matrix W(i) is obtained from a mother matrix $W_n$, and $W_n$ is obtained according to the following formula:

$$W_n = I_4 - \frac{2u_n u_n^H}{u_n^H u_n}.$$

Indexes of the mother matrix are orderly combined to obtain the required precoding matrix W(i).

The received signal is determined as:

$$y(i) = H \cdot [W(i)D(i)U] \cdot \begin{bmatrix} x^{(0)}(i) \\ M \\ x^{(M-1)}(i) \end{bmatrix} + n.$$

(3) Determine a precoding matrix as:

$W=C_k D(i)U.$ (4) Determine an equivalent spatial channel matrix as:

$H_e=H \cdot [C_k D(i)U].$ (5) Perform decoding on the signal.

The system uses the zero forcing algorithm, and a linear association coefficient matrix on a subcarrier i is:

$H_e^+=[H_e^H H_e]^{-1} H_e^H.$

A detection result of a transmit signal is:

$$x(i) = H_e^+ H C_k D(i)U \begin{bmatrix} x^{(0)}(1) \\ M \\ x^{(M-1)}(1) \end{bmatrix} + H_e^+ n =$$

$$H_e^+ H_e \begin{bmatrix} x^{(0)}(1) \\ M \\ x^{(M-1)}(1) \end{bmatrix} + H_e^+ n = \begin{bmatrix} x^{(0)}(1) \\ M \\ x^{(M-1)}(1) \end{bmatrix} + H_e^+ n.$$

The foregoing steps (1) to (5) are an existing common process of the open-loop spatial multiplexing precoding based on the large delay CDD. The following describes a method in this embodiment of the present disclosure that is applied to the common process, that is, a cross-layer security process of the open-loop spatial multiplexing precoding based on the large delay CDD in this embodiment of the present disclosure. Specific steps in this embodiment of the present disclosure may be as follows.

A process based on a transmitter (a base station) is as follows.

(1) The transmitter and a receiver share a pseudo random keystream in advance:

$F_{control}=(f_1, f_2, \ldots, f_i, \ldots)$

When $f_i=0$, it indicates that the precoding matrix is rotated by 0 degrees on a subcarrier i; or when $f_i=1$, indicates that the precoding matrix is rotated by 180 degrees on a subcarrier i.

(2) Channel information does not change, and an optimal precoding matrix in an $i^{th}$ timeslot does not change and still is:

$W=C_k D(i)U.$ (3) Perform rotation processing on a diagonal matrix D(i):

$D^R=e^{j\pi}D(i).$ (4) Perform rotation processing on the precoding matrix.

The rotation processing may be that the precoding matrix is rotated by 180 degrees, or may be that the precoding matrix is rotated by 0 degrees. An objective of layer crossing in this embodiment of the present disclosure is, under indication of the pseudo random keystream, a precoding matrix selected by the transmit end in the $i^{th}$ timeslot is changed into:

$W_i = e^{j\pi f_i} W.$ (5) When $f_i=1$, the precoding matrix is rotated by 180 degrees. A rotated precoding matrix is:

$W^R = C_k D^R(i) U.$ (6) When $f_i=1$, a signal received by the receive end is:

$$y = HW^R \begin{bmatrix} x^{(0)}(1) \\ M \\ x^{(M-1)}(1) \end{bmatrix} + n.$$

A process for an authorized receiver (user equipment) is as follows.

(1) A transmitter and the receiver share a pseudo random keystream in advance.

When $f_i=0$, it indicates that the precoding matrix is rotated by 0 degrees at an $i^{th}$ moment; or when $f_i=1$, it indicates that the precoding matrix is rotated by 180 degrees at an $i^{th}$ moment.

(2) If $f_i=0$, the authorized receive end obtains a true transmit signal according to an existing common method; or if $f_i=1$, the authorized receive end learns that the precoding matrix has been rotated by 180 degrees, and in this case, a signal obtained by the receive end is:

$$y=HW^R X+n$$

(3) An equivalent channel matrix is:

$$\overline{H}=HW^R=e^{j\pi}HW.$$

(4) Detect a signal based on a zero forcing algorithm.

An association coefficient matrix in the zero forcing algorithm is:

$$\overline{H}^+=[\overline{H}^H\overline{H}]^{-1}\overline{H}^H$$

A detection result is:

$$\tilde{X}=\overline{H}^+y=\overline{H}^+HW^R X+\overline{H}^+n=\overline{H}^+\overline{H}X+\overline{H}^+n=X+\overline{H}^+n.$$

Therefore, the authorized receive end obtains the transmit signal by performing correct decoding using the foregoing steps (1) to (4).

A process for an eavesdropper is as follows:

(1) A pseudo-random sequence guessed by the eavesdropper is:

$$F_{control}{}^g=(f_1{}^g, f_2{}^g, \ldots, f_i{}^g, \ldots).$$

(2) If $f_i{}^g=0$, and it is assumed in this case that indication information of a transmitter is $f_i=0$, the eavesdropper can obtain a true transmit signal; or if $f_i=1$ in this case, a real signal received by the eavesdropper is $y=HW^R X+n$, where $W^R=e^{j\pi}W$. A detection process is as follows. The eavesdropper guesses the indication information, and the eavesdropper mistakes a real precoding matrix $w^R$ for $w$; an equivalent channel matrix is considered as:

$$\overline{H}=HW;$$

a zero forcing detection algorithm is used:

$$\overline{H}^+=[\overline{H}^H\overline{H}]^{-1}\overline{H}^H; \text{ and}$$

a finally detected signal is:

$$\tilde{X}=\overline{H}^+y=\overline{H}^+HW^R X+\overline{H}^+n=\overline{H}^+ e^{j\pi}\overline{H}X+\overline{H}^+n=e^{j\pi}X+\overline{H}^+n.$$

In this case, a detection result is a result obtained after an original transmit signal is rotated by 180 degrees, and the detection result has a maximum error rate.

(3) If $f_i{}^g=1$, and it is assumed in this case that indication information of a transmitter is $f_i=1$, the eavesdropper can obtain a true transmit signal; or if $f_i=0$ in this case, a real signal received by the eavesdropper is $y=HWX+n$, where $W^R=e^{j\pi}W$. A detection process is as follows.

The eavesdropper guesses the indication information, and the eavesdropper mistakes a real precoding matrix $w$ for $w^R$; an equivalent channel matrix is considered as:

$$\overline{H}=HW^R;$$

the eavesdropper uses a zero forcing detection algorithm:

$$\overline{H}^+=[\overline{H}^H\overline{H}]^{-1}\overline{H}^H; \text{ and}$$

a finally detected signal is:

$$\tilde{X}=\overline{H}^+y=e^{j\pi}\overline{H}^+\overline{H}X+\overline{H}^+n=e^{j\pi}X+\overline{H}^+n.$$

In this case, a transmit signal determined by the eavesdropper has a value obtained by rotating an original transmit signal constellation point by 180 degrees, and the transmit signal has a maximum error rate.

Optionally, in an embodiment, this embodiment of the present disclosure may be applicable to non-codebook precoding (SVD precoding). A specific implementation manner is as follows.

(1) Estimate a downlink channel matrix.

It is assumed that a transmit antenna of a BS end is $N_t$, and a receive antenna of a UE end is $N_r$. Using symmetry of an uplink and a down link in a TDD system, a BS may estimate the downlink channel matrix $H_{N_r \times N_t}$ according to an uplink pilot signal.

(2) Perform singular value decomposition on the channel matrix $H_{N_r \times N_t}$ to obtain:

$$H=U\Sigma V^H, \text{ where}$$

both a U matrix and a V matrix are unitary coding matrices, and dimensions of the two matrices are $N_r \times N_r$ and $N_t \times N_t$; $\Sigma$ is a diagonal matrix, and a diagonal element of the diagonal matrix is a singular value H, where $\lambda_1 \geq \lambda_2 \geq L \geq \lambda_n > 0$, and $n=\min(N_r, N_t)$.

(3) Use the unitary matrix V as the precoding matrix, and precode data and a dedicated pilot signal to obtain:

$$Y=HVX+n=H_E X+n.$$

Because V is the unitary matrix, a channel capacity does not change after the precoding. In addition, because both the data and a pilot are precoded, a receiver only needs to calculate an equivalent channel matrix HE of each beam.

An equalization matrix of the receive end is:

$$G=\Sigma^{-1}U^H.$$

(4) Restore a signal:

$$Y = GHVX + Gn$$
$$= \Sigma^{-1}U^H HVX + \Sigma^{-1}U^H n$$
$$= \Sigma^{-1}U^H (U\Sigma V^H)VX + \Sigma^{-1}U^H n$$
$$= X + \Sigma^{-1}U^H n.$$

The foregoing steps (1) to (4) are an existing common process of the SVD precoding. The following describes a method in this embodiment of the present disclosure that is applied to the common process, that is, a cross-layer security process of the SVD precoding in this embodiment of the present disclosure. Specific steps in this embodiment of the present disclosure may be as follows.

A process based on a transmitter (a base station) is as follows.

(1) The transmitter and a receiver share a pseudo random keystream in advance:

$$F_{control}=(f_1, f_2, \ldots, f_i, \ldots).$$

When $f_i=0$, it indicates that the precoding matrix is rotated by 0 degrees at an $i^{th}$ moment; or when $f_i=1$, it indicates that the precoding matrix is rotated by 180 degrees at an $i^{th}$ moment.

(2) An optimal precoding matrix in an $i^{th}$ timeslot is:

$$V^i=e^{j\pi f_i}V.$$

(3) When $f_i=1$, the precoding matrix is rotated by 180 degrees. A rotated precoding matrix is:

$$V^R=e^{j\pi}V.$$

(4) When $f_i=1$, a signal received by the receive end is:

$$Y=HV^R X+n.$$

A process for an eavesdropper is as follows.

(1) A pseudo-random sequence guessed by the eavesdropper is:

$$F_{control}^g = (f_1^g, f_2^g, \ldots, f_i^g, \ldots).$$

(2) If $f_i^g=0$, and it is assumed in this case that indication information of a transmitter is $f_i=0$, the eavesdropper can obtain a true transmit signal; or if $f_i=1$ in this case, a real signal received by the eavesdropper is $Y=HV^R X+n$, where $V^R=e^{j\pi}V$. A detection process is as follows. The eavesdropper guesses the indication information, and the eavesdropper mistakes a real precoding matrix $V^R$ for V; an equivalent channel matrix is considered as:

$$\overline{H}=HV=He^{j\pi}V^R;$$

a receive equalization matrix is not rotated in this case:

$$G=\Sigma^{-1}U^H;\text{ and}$$

a finally determined signal is:

$$\begin{aligned}\overset{\%}{X} &= (\Sigma^{-1}U^H)HV^R X + \Sigma^{-1}U^H n \\ &= (\Sigma^{-1}U^H)(U\Sigma V^H)e^{j\pi}VX + \Sigma^{-1}U^H n \\ &= e^{j\pi}X + \Sigma^{-1}U^H n.\end{aligned}$$

In this case, a detection result is a result obtained after an original transmit signal is rotated by 180 degrees, and the detection result has a maximum error rate.

(3) If $f_i^g=1$, and it is assumed in this case that indication information of a transmitter is $f_i=1$, the eavesdropper can obtain a true transmit signal; or if $f_i=0$ in this case, a real signal received by the eavesdropper is $Y=HVX+n$, where $V^R=e^{j\pi}V$. A detection process is as follows.

The eavesdropper guesses the indication information, and the eavesdropper mistakes a real precoding matrix V for $V^R$; an equivalent channel matrix is considered as:

$$\overline{H}=HV^R=He^{j\pi}V;$$

the receive end rotates the equalization matrix by 180 degrees:

$$G=e^{j\pi}\Sigma^{-1}U^H;\text{ and}$$

a finally determined signal is:

$$\begin{aligned}\overset{\%}{X} &= (e^{j\pi}\Sigma^{-1}U^H)HVX + e^{j\pi}\Sigma^{-1}U^H n \\ &= (e^{j\pi}\Sigma^{-1}U^H)(U\Sigma V^H)VX + e^{j\pi}\Sigma^{-1}U^H n \\ &= e^{j\pi}X + e^{j\pi}\Sigma^{-1}\overline{H}^+ n.\end{aligned}$$

In this case, a transmit signal determined by the eavesdropper has a value obtained by rotating an original transmit signal constellation point by 180 degrees, and the transmit signal has a maximum error rate.

Figure 6:
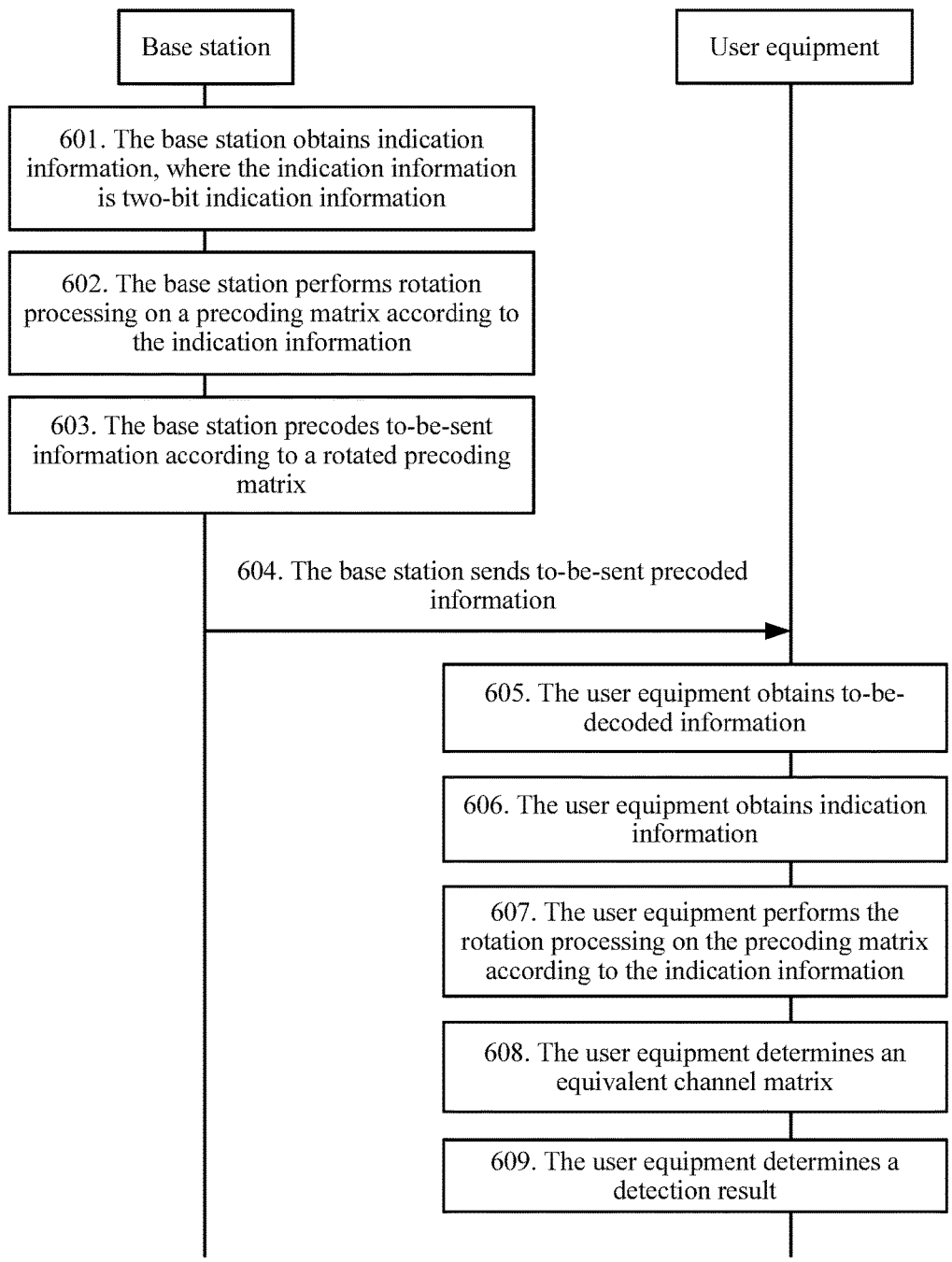
FIG. 6 is a schematic flowchart of a data transmission process according to another embodiment of the present disclosure.

FIG. 6 is a schematic flowchart of a data transmission process according to another embodiment of the present disclosure. Indication information in FIG. 6 is two-bit indication information. Processes in FIG. 6 include a process of performing precoding by a base station and a process of performing decoding by user equipment.

601. The base station obtains indication information, where the indication information is two-bit indication information.

It should be understood that the two-bit indication information means that two bits are used to indicate whether to rotate a precoding matrix.

The indication information is set based on a pseudo random keystream $F_{control}=(f_1, f_2, \ldots, f_i, \ldots)$. A variable $x_i$ is introduced, $x_i$ in this embodiment of the present disclosure may be 0, 1, 2, or 3, and $x_i$ may be used to indicate an angle of rotation of the precoding matrix. When $f_{2i}f_{2i+1}=00$, it indicates that the precoding matrix is not rotated at an $i^{th}$ moment, and in this case, $x_i$ is 0; or when $f_{2i}f_{2i+1}\neq 00$, it indicates that the precoding matrix is rotated at an $i^{th}$ moment, and in this case, $x_i$ is 1, 2, or 3.

602. The base station performs rotation processing on a precoding matrix according to the indication information.

Optionally, in an embodiment, it may be set that when $f_{2i}f_{2i+1}=00$, it indicates that the precoding matrix is not rotated at an $i^{th}$ moment; when $f_{2i}f_{2i+1}=01$, it indicates that the precoding matrix is rotated by 90 degrees at an $i^{th}$ moment, and in this case, x is 1; if $f_{2i}f_{2i+1}=10$, it indicates that the precoding matrix is rotated by 180 degrees at an $i^{th}$ moment, and in this case, $x_i$ is 2; or if $f_{2i}f_{2i+1}=11$, it indicates that the precoding matrix is rotated by 270 degrees at an $i^{th}$ moment, and in this case, $x_i$ is 3.

603. The base station precodes to-be-sent information according to a rotated precoding matrix.

The indication information is set to $t=\log_2 M$-bit indication information, that is, the indication information has t bits. The rotated precoding matrix may be represented as:

$$W_{opt}^i = e^{j\frac{2\pi}{M}x_i}W_{opt}.$$

After a precoding selection process, final to-be-sent information obtained after the precoding processing is:

$$y = He^{j\frac{2\pi}{M}x_i}W_{opt}X + n.$$

604. The base station sends to-be-sent precoded information.

605. The user equipment obtains to-be-decoded information.

It should be understood that the to-be-sent precoded information sent in step 604 is the to-be-decoded information obtained by the user equipment in step 605. The to-be-decoded information is:

$$y = He^{j\frac{2\pi}{M}x_i}W_{opt}X + n.$$

606. The user equipment obtains indication information.

The indication information is set based on a pseudo random keystream $F_{control}=(f_1, f_2, \ldots, f_i, \ldots)$. A variable $x_i$ is introduced, $x_i$ in this embodiment of the present disclosure may be 0, 1, 2, or 3, and $x_i$ may be used to indicate an angle of rotation of the precoding matrix. When $f_{2i}f_{2i+1}=00$, it indicates that the precoding matrix is not rotated at an $i^{th}$ moment, and in this case, $x_i$ is 0; or when $f_{2i}f_{2i+1}\neq 00$, it indicates that the precoding matrix is rotated at an $i^{th}$ moment, and in this case, $x_i$ is 1, 2, or 3.

607. The user equipment performs the rotation processing on the precoding matrix according to the indication information.

The indication information is set to $t=\log_2 M$-bit indication information, that is, the indication information has t bits. The rotated precoding matrix may be represented as:

$$W_{opt}^i = e^{j\frac{2\pi}{M}x_i} W_{opt},$$

where $W_{opt}$ is a preset precoding matrix, $W_{opt}^i$ is a precoding matrix obtained after rotation processing at an $i^{th}$ moment, $f_i$ is indication information at the $i^{th}$ moment, i is a real number greater than or equal to zero, and M is a positive integer greater than zero.

608. The user equipment determines an equivalent channel matrix.

The equivalent channel matrix is:

$$\overline{H} = He^{j\frac{2\pi}{M}x_i} W_{opt}.$$

609. The user equipment determines a detection result. A detection step may be:

$$\tilde{X} = \overline{H}^+ y = \overline{H}^+ \overline{H} X + \overline{H}^+ n = X + \overline{H}^+ n.$$

Therefore, an authorized receive end (the user equipment) obtains true sent information.

In addition, for an eavesdropper, the eavesdropper does not know the indication information. Therefore, the eavesdropper may perform detection according to a precoding matrix before rotation, or may perform detection by guessing the indication information ($f_1^g, f_2^g, K, f_i^g, K$). However, an error rate of guessing the indication information by the eavesdropper reaches 0.5. In this case, a transmit signal determined by the eavesdropper has a value obtained by rotating an original transmit signal constellation point by 180 degrees, and the transmit signal has a maximum error rate.

Figure 7:
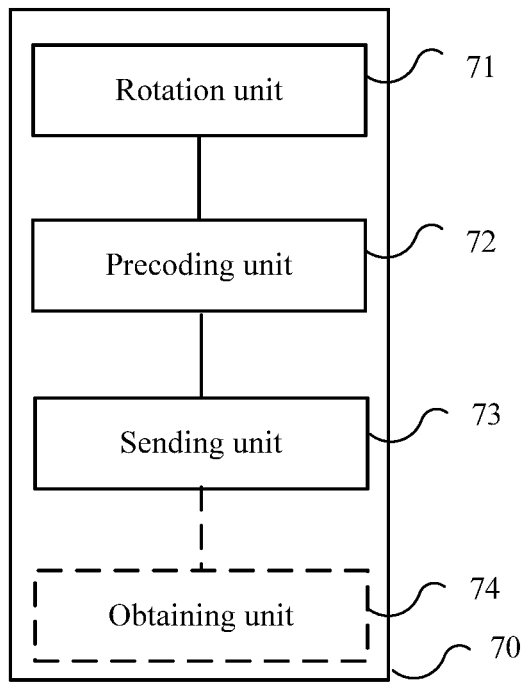
FIG. 7 is a schematic block diagram of a base station according to an embodiment of the present disclosure.

FIG. 7 is a schematic block diagram of a base station according to an embodiment of the present disclosure. The base station 70 in FIG. 7 may implement the method or the process in FIG. 1 or FIG. 4. To avoid repetition, details are not described herein. The base station 70 may include a rotation unit 71, a precoding unit 72, and a sending unit 73.

The rotation unit 71 performs rotation processing on a preset precoding matrix.

The precoding unit 72 performs precoding processing on to-be-sent information according to a precoding matrix obtained after the rotation processing.

The sending unit 73 sends to-be-sent information obtained after the precoding processing.

In this embodiment of the present disclosure, indication information shared by a transmit end and a receive end is used to indicate whether to rotate a precoding matrix, and to-be-sent information is precoded according to the indication information. The transmit end and the receive end in this method learn the indication information in advance, and system security is improved by instructing the precoding matrix to perform flexible transformation.

In addition, according to this embodiment of the present disclosure, an eavesdropping error rate is improved with reference to a physical layer security technology and an upper-layer cryptographic technique instead of depending on channel information.

Optionally, in another embodiment, the apparatus 70 further includes an obtaining unit 74.

The obtaining unit 74 obtains indication information, where the indication information is used to instruct the base station to perform the rotation processing on the preset precoding matrix. The rotation unit 71 may perform the rotation processing on the preset precoding matrix according to the indication information obtained by the obtaining unit.

Optionally, in another embodiment, the sending unit 73 may further send indication information, where the indication information is used to instruct user equipment to perform the rotation processing on the preset precoding matrix.

Optionally, in another embodiment, the indication information sent by the sending unit 73 or the indication information obtained by the obtaining unit 74 is carried based on a pseudo random keystream $F=(f_1, f_2, \ldots, f_i, \ldots)$, where $f_i$ is indication information at an $i^{th}$ moment, and i is a real number greater than or equal to zero.

Optionally, in another embodiment, the indication information sent by the sending unit 73 or the indication information obtained by the obtaining unit 74 is one-bit indication information or multi-bit indication information.

Optionally, in another embodiment, the rotation unit 71 may perform the rotation processing on the preset precoding matrix, so that the preset precoding matrix is rotated by 180 degrees.

Optionally, in another embodiment, the indication information is one-bit indication information, and the rotation unit 71 may perform the rotation processing on the preset precoding matrix based on the following formula, so that the preset precoding matrix is rotated by 180 degrees:

$$W_{opt}^i = e^{j\pi f_i} W_{opt},$$

where $W_{opt}$ is the preset precoding matrix, $W_{opt}^i$ is a precoding matrix obtained after rotation processing at an $i^{th}$ moment, $f_i$ is indication information at the $i^{th}$ moment, and i is a real number greater than or equal to zero.

Figure 8:
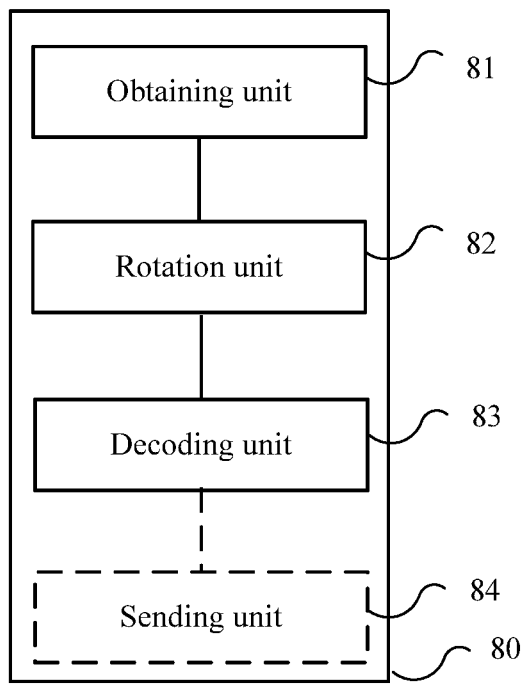
FIG. 8 is a schematic block diagram of user equipment according to an embodiment of the present disclosure.

FIG. 8 is a schematic block diagram of user equipment according to an embodiment of the present disclosure. The user equipment 80 in FIG. 8 may implement the method or the process in FIG. 2 or FIG. 5. To avoid repetition, details are not described herein. The user equipment 80 may include an obtaining unit 81, a rotation unit 82, and a decoding unit 83.

The obtaining unit 81 obtains to-be-decoded information.

The rotation unit 82 performs rotation processing on a preset precoding matrix.

The decoding unit 83 performs decoding processing on the to-be-decoded information according to a precoding matrix obtained after the rotation processing.

In this embodiment of the present disclosure, indication information shared by a transmit end and a receive end is used to indicate whether to rotate a precoding matrix, and to-be-sent information is precoded according to the indication information. The transmit end and the receive end in this method learn the indication information in advance, and system security is improved by instructing the precoding matrix to perform flexible transformation.

In addition, according to this embodiment of the present disclosure, an eavesdropping error rate is improved with reference to a physical layer security technology and an upper-layer cryptographic technique instead of depending on channel information.

Optionally, in another embodiment, the user equipment 80 further includes a sending unit 84.

The sending unit 84 sends indication information, where the indication information is used to instruct a base station to perform the rotation processing on the preset precoding matrix.

Optionally, in another embodiment, the obtaining unit 81 may further obtain indication information, where the indication information is used to instruct the user equipment to perform the rotation processing on the preset precoding matrix. The rotation unit 82 may perform the rotation processing on the preset precoding matrix according to the indication information.

Optionally, in another embodiment, the indication information obtained by the obtaining unit 81 or the indication information sent by the sending unit 84 may be carried based on a pseudo random keystream $F=(f_1, f_2, \ldots, f_i, \ldots)$, where $f_i$ is indication information at an $i^{th}$ moment, and i is a real number greater than or equal to zero.

Optionally, in another embodiment, the indication information obtained by the obtaining unit 81 or the indication information sent by the sending unit 84 may be one-bit indication information or multi-bit indication information.

Optionally, in another embodiment, the rotation unit 82 may perform the rotation processing on the preset precoding matrix, so that the preset precoding matrix is rotated by 180 degrees.

Optionally, in another embodiment, the indication information is one-bit indication information, and the rotation unit 82 may perform the rotation processing on the preset precoding matrix based on the following formula, so that the preset precoding matrix is rotated by 180 degrees:

$$W_{opt}^i = e^{j\pi f_i} W_{opt},$$

where $W_{opt}$ is the preset precoding matrix, $W_{opt}^i$ is a precoding matrix obtained after rotation processing at an $i^{th}$ moment, $f_i$ is indication information at the $i^{th}$ moment, and i is a real number greater than or equal to zero.

Figure 9:
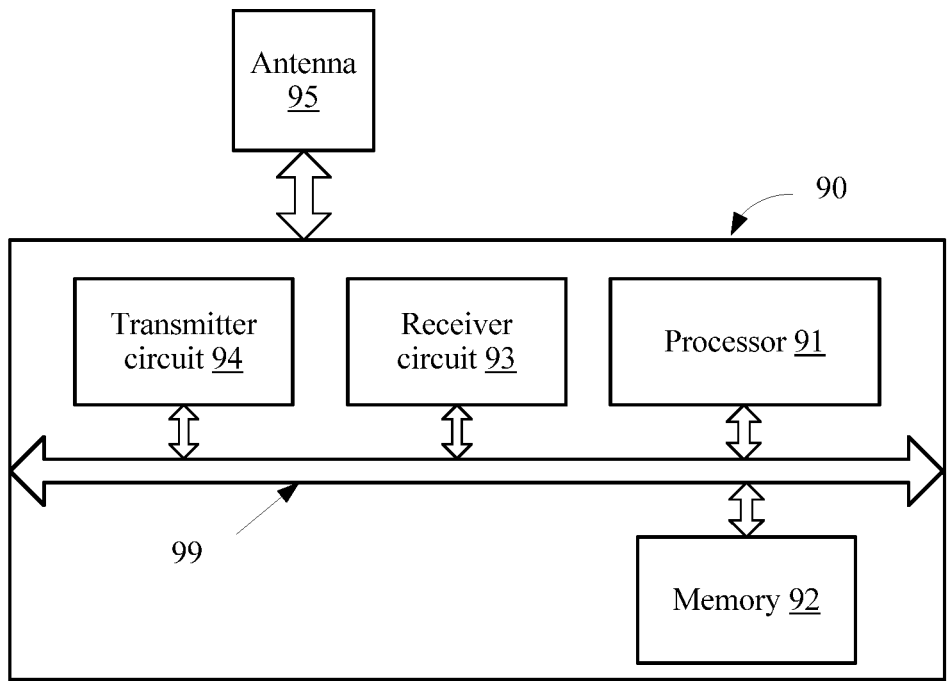
FIG. 9 is a schematic block diagram of a base station according to another embodiment of the present disclosure.

FIG. 9 is a schematic block diagram of a base station according to another embodiment of the present disclosure. The base station 90 in FIG. 9 may be configured to implement steps and methods in the foregoing method embodiments. The base station 90 in FIG. 9 includes a processor 91, a memory 92, a receiver circuit 93, and a transmitter circuit 94. The processor 91, the memory 92, and the receiver circuit 93 are connected using a bus system 99.

In addition, the base station 90 may further include an antenna 95, and the like. The processor 91 controls an operation of the base station 90. The memory 92 may include a read-only memory and a random access memory, and may provide an instruction and data for the processor 91. A part of the memory 92 may further include a nonvolatile random access memory (NVRAM). In a specific application, the transmitter circuit 94 and the receiver circuit 93 may be coupled to the antenna 95. All components of the base station 90 are coupled together using the bus system 99. In addition to a data bus, the bus system 99 includes a power bus, a control bus, and a status signal bus. However, for clarity of description, various buses are marked as the bus system 99 in the figure.

The processor 91 may be an integrated circuit chip and has a signal processing capability. The foregoing processor 91 may be a general-purpose processor, a digital signal processor (DSP), an application-specific integrated circuit (ASIC), a field programmable gate array (FPGA), or another programmable logic device, a discrete gate or a transistor logic device, or a discrete hardware component, which may implement or perform the methods, the steps, and the logical block diagrams disclosed in the embodiments of the present disclosure. The general-purpose processor may be a microprocessor, or the processor may be any conventional processor, or the like. The processor 91 reads information in the memory 92, and controls all parts of the base station 90 in combination with hardware of the processor 91.

The method in FIG. 1 may be implemented by the base station 90 in FIG. 9. To avoid repetition, details are not described herein.

Under control of the processor 91, the base station 90 completes the following operations: performing rotation processing on a preset precoding matrix; performing precoding processing on to-be-sent information according to a precoding matrix obtained after the rotation processing; and sending to-be-sent information obtained after the precoding processing.

In this embodiment of the present disclosure, indication information shared by a transmit end and a receive end is used to indicate whether to rotate a precoding matrix, and to-be-sent information is precoded according to the indication information. The transmit end and the receive end in this method learn the indication information in advance, and system security is improved by instructing the precoding matrix to perform flexible transformation.

In addition, according to this embodiment of the present disclosure, an eavesdropping error rate is improved with reference to a physical layer security technology and an upper-layer cryptographic technique instead of depending on channel information.

Optionally, in another embodiment, the receiver circuit 93 may obtain indication information, where the indication information is used to instruct the base station to perform the rotation processing on the preset precoding matrix. The processor 91 performs the rotation processing on the preset precoding matrix according to the indication information.

Optionally, in another embodiment, the transmitter circuit 94 may send indication information, where the indication information is used to instruct user equipment to perform the rotation processing on the preset precoding matrix.

Optionally, in another embodiment, the indication information may be carried based on a pseudo random keystream $F=(f_1, f_2, \ldots, f_i, \ldots)$, where $f_i$ is indication information at an $i^{th}$ moment, and i is a real number greater than or equal to zero.

Optionally, in another embodiment, the indication information may be one-bit indication information or multi-bit indication information.

Optionally, in another embodiment, the processor 91 may perform the rotation processing on the preset precoding matrix, so that the preset precoding matrix is rotated by 180 degrees.

Optionally, in another embodiment, the indication information is one-bit indication information, and the processor 91 may perform the rotation processing on the preset precoding matrix based on the following formula, so that the preset precoding matrix is rotated by 180 degrees:

$$W_{opt}^i = e^{j\pi f_i} W_{opt},$$

where $W_{opt}$ is the preset precoding matrix, $W_{opt}^i$ is a precoding matrix obtained after rotation processing at an $i^{th}$ moment, $f_i$ is indication information at the $i^{th}$ moment, and i is a real number greater than or equal to zero.

Figure 10:
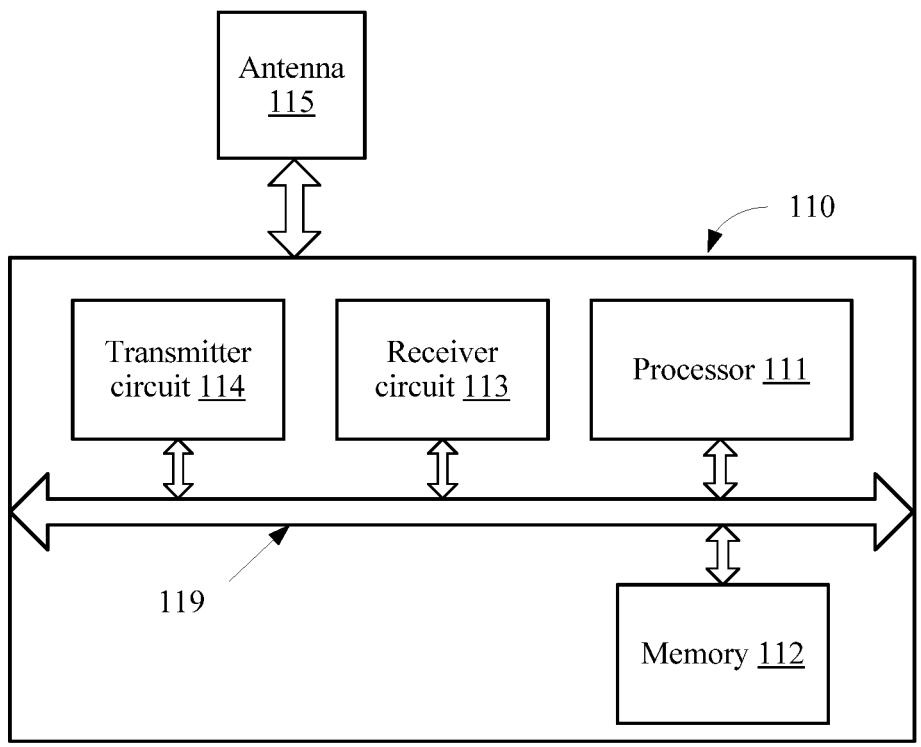
FIG. 10 is a schematic block diagram of user equipment according to another embodiment of the present disclosure.

FIG. 10 is a schematic block diagram of user equipment according to another embodiment of the present disclosure. The user equipment 110 in FIG. 10 may be configured to implement steps and methods in the foregoing method embodiments. The user equipment 110 in FIG. 10 includes a processor 111, a memory 112, a receiver circuit 113, and a transmitter circuit 114. The processor 111, the memory 112, and the receiver circuit 113 are connected using a bus system 119.

In addition, the user equipment 110 may further include an antenna 115, and the like. The processor 111 controls an operation of the user equipment 110. The memory 112 may include a read-only memory and a random access memory, and may provide an instruction and data for the processor 111. A part of the memory 112 may further include a NVRAM. In a specific application, the transmitter circuit 114 and the receiver circuit 113 may be coupled to the antenna 115. All components of the user equipment 110 are coupled together using the bus system 119. In addition to a data bus, the bus system 119 includes a power bus, a control bus, and a status signal bus. However, for clarity of description, various buses are marked as the bus system 119 in the figure.

The processor 111 may be an integrated circuit chip and has a signal processing capability. The foregoing processor 111 may be a general-purpose processor, a DSP, an ASIC, a FPGA, or another programmable logic device, a discrete gate or a transistor logic device, or a discrete hardware component, which may implement or perform the methods, the steps, and the logical block diagrams disclosed in the embodiments of the present disclosure. The general-purpose processor may be a microprocessor, or the processor may be any conventional processor, or the like. The processor 111 reads information in the memory 112, and controls all parts of the user equipment 110 in combination with hardware of the processor 111.

The method in FIG. 2 may be implemented by the user equipment 110 in FIG. 10. To avoid repetition, details are not described herein.

Under control of the processor 111, the user equipment 110 completes the following operations: obtaining to-be-decoded information; performing rotation processing on a preset precoding matrix; and performing decoding processing on the to-be-decoded information according to a precoding matrix obtained after the rotation processing.

In this embodiment of the present disclosure, indication information shared by a transmit end and a receive end is used to indicate whether to rotate a precoding matrix, and to-be-sent information is precoded according to the indication information. The transmit end and the receive end in this method learn the indication information in advance, and system security is improved by instructing the precoding matrix to perform flexible transformation.

In addition, according to this embodiment of the present disclosure, an eavesdropping error rate is improved with reference to a physical layer security technology and an upper-layer cryptographic technique instead of depending on channel information.

Optionally, in another embodiment, the transmitter circuit 114 may send indication information, where the indication information is used to instruct a base station to perform the rotation processing on the preset precoding matrix.

Optionally, in another embodiment, the receiver circuit 113 may obtain indication information, where the indication information is used to instruct the user equipment to perform the rotation processing on the preset precoding matrix. The processor 111 performs the rotation processing on the preset precoding matrix according to the indication information.

Optionally, in another embodiment, the indication information is carried based on a pseudo random keystream $F=(f_1, f_2, \ldots, f_i, \ldots)$, where $f_i$ is indication information at an $i^{th}$ moment, and i is a real number greater than or equal to zero.

Optionally, in another embodiment, the indication information is one-bit indication information or multi-bit indication information.

Optionally, in another embodiment, the processor 111 may perform the rotation processing on the preset precoding matrix, so that the preset precoding matrix is rotated by 180 degrees.

Optionally, in another embodiment, the indication information is one-bit indication information, and the processor may perform the rotation processing on the preset precoding matrix based on the following formula, so that the preset precoding matrix is rotated by 180 degrees:

$$W_{opt}^i = e^{j\pi f_i} W_{opt},$$

where $W_{opt}$ is the preset precoding matrix, $W_{opt}^i$ is a precoding matrix obtained after rotation processing at an $i^{th}$ moment, $f_i$ is indication information at the $i^{th}$ moment, and i is a real number greater than or equal to zero.

It should be understood that "an embodiment" mentioned in the whole specification does not mean that particular features, structures, or features related to the embodiment are included in at least one embodiment of the present disclosure. Therefore, "in an embodiment" appearing throughout the specification does not refer to a same embodiment. In addition, these particular features, structures, or features may be combined in one or more embodiments using any appropriate manner. Sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure. Sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

It should be understood that "an embodiment" mentioned in the whole specification does not mean that particular features, structures, or features related to the embodiment are included in at least one embodiment of the present disclosure. Therefore, "in an embodiment" appearing throughout the specification does not refer to a same embodiment. In addition, these particular features, structures, or features may be combined in one or more embodiments using any appropriate manner. Sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is used as an example but is not limited: The computer readable medium may include a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely an example of embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A data transmission method at a base station, the method comprising:
   performing rotation processing on a preset precoding matrix, wherein performing the rotation processing comprises:
      obtaining indication information, wherein the indication information instructs a base station to perform the rotation processing on the preset precoding matrix, and wherein the indication information is one-bit indication information;
      performing the rotation processing, on the preset precoding matrix according to the indication information; and
      performing the rotation processing on the preset precoding matrix based on the following formula such that the preset precoding matrix is rotated by 180 degrees:
         $W_{opt}^{i}=e^{j\pi f_i}W_{opt}$, wherein $W_{opt}$ is the preset precoding matrix, wherein $W_{opt}^{i}$ is a precoding matrix obtained after rotation processing at an $i^{th}$ moment, wherein $f_i$ is indication information at the $i^{th}$ moment, and wherein i is a real number greater than or equal to zero;
   performing precoding processing on to-be-sent information according to a precoding matrix obtained after the rotation processing; and
   sending to-be-sent information obtained after the precoding processing.

2. The method of claim 1, further comprising sending indication information instructing user equipment to perform the rotation processing on the preset preceding matrix.

3. A data transmission method at a user equipment, the method comprising:
  obtaining to-be-decoded information;
  performing rotation processing on a preset precoding matrix, wherein performing the rotation processing comprises:
    obtaining indication information, wherein the indication information instructs a base station to perform the rotation processing on the preset precoding matrix, and wherein the indication information is one-bit indication information;
    performing the rotation processing on the preset precoding matrix according to the indication information; and
    performing the rotation processing on the preset precoding matrix based on the following formula such that the preset precoding matrix is rotated by 180 degrees:
      $W_{opt}^{i}=e^{j\pi f_i}W_{opt}$, wherein $W_{opt}$ is the preset precoding matrix, wherein $W_{opt}^{i}$ is a precoding matrix obtained after rotation processing at an $i^{th}$ moment, wherein $f_i$ is indication information at the $i^{th}$ moment, and wherein i is a real number greater than or equal to zero; and
  performing decoding processing on the to-be-decoded information according to a precoding matrix obtained after the rotation processing.

4. The method of claim 3, further comprising sending indication information instructing a base station to perform the rotation processing on the preset precoding matrix.

5. A base station, comprising:
  a memory storing executable instructions;
  a processor coupled to the memory and configured to:
    perform rotation processing on a preset precoding matrix, wherein performing the rotation processing comprises:
      obtaining indication information, wherein the indication information instructs a base station to perform the rotation processing on the preset precoding matrix, and wherein the indication information is one-bit indication information;
      performing the rotation processing on the preset precoding matrix according to the indication information; and
      performing the rotation processing on the preset precoding matrix based on the following formula such that the preset precoding matrix is rotated by 180 degrees:
        $W_{opt}^{i}=e^{j\pi f_i}W_{opt}$, wherein $W_{opt}$ is the preset precoding matrix, wherein $W_{opt}^{i}$ is a precoding matrix obtained after rotation processing at an $i^{th}$ moment, wherein $f_i$ is indication information at the $i^{th}$ moment, and wherein i is a real number greater than or equal to zero; and
    perform precoding processing on to-be-sent information according to a precoding matrix obtained after the rotation processing; and
  a transmitter coupled to the processor and configured to send to-be-sent information obtained after the precoding processing.

6. The base station of claim 5, wherein the transmitter is further configured to send indication information instructing user equipment to perform the rotation processing on the preset precoding matrix.

7. User equipment, comprising:
  a memory storing executable instructions; and
  a processor coupled to the memory and configured to:
    obtain to-be-decoded information;
    perform rotation processing on a preset precoding matrix, wherein performing the rotation processing comprises:
      obtain indication information, wherein the indication information instructs a base station to perform the rotation processing on the preset precoding matrix, and wherein the indication information is one-bit indication information;
      perform the rotation processing on the preset precoding matrix according to the indication information; and
      perform the rotation processing on the preset precoding matrix based on the following formula such that the preset precoding matrix is rotated by 180 degrees:
        $W_{opt}^{i}=e^{j\pi f_i}W_{opt}$, wherein $W_{opt}$ is the preset precoding matrix, wherein $W_{opt}^{i}$ is a precoding matrix obtained after rotation processing at an $i^{th}$ moment, wherein $f_i$ is indication information at the $i^{th}$ moment, and wherein i is a real number greater than or equal to zero; and
    perform decoding processing on the to-be-decoded information according to a precoding matrix obtained after the rotation processing.

8. The user equipment of claim 7, further comprising a transmitter coupled to the processor and configured to send indication information instructing a base station to perform the rotation processing on the preset preceding matrix.

* * * * *

UNITED STATES PATENT AND TRADEMARK OFFICE
CERTIFICATE OF CORRECTION

PATENT NO. : 10,305,866 B2
APPLICATION NO. : 15/592385
DATED : May 28, 2019
INVENTOR(S) : Hunhuan Song, Hong Wen and Jie Tang Page 1 of 1

It is certified that error appears in the above-identified patent and that said Letters Patent is hereby corrected as shown below:

In the Claims

Column 40, Claim 8, Line 48 should read:
the rotation processing on the preset precoding matrix.

Signed and Sealed this
Twenty-third Day of July, 2019

Andrei Iancu
*Director of the United States Patent and Trademark Office*